United States Patent [19]

Datwyler et al.

[11] Patent Number: 5,442,754
[45] Date of Patent: Aug. 15, 1995

[54] RECEIVING CONTROL LOGIC SYSTEM FOR DUAL BUS NETWORK

[75] Inventors: Wayne C. Datwyler; Paul B. Ricci, both of Laguna Niguel, Calif.

[73] Assignee: Unisys Corporation, Blue Bell, Pa.

[21] Appl. No.: 985,662

[22] Filed: Dec. 4, 1992

[51] Int. Cl.$^6$ .................................. G06F 13/00
[52] U.S. Cl. ..................... 395/325; 364/DIG. 1; 364/238.6; 364/239.1; 364/240; 364/240.8; 364/247
[58] Field of Search ............... 395/325, 250, 200, 275, 395/725, 700; 371/68.1

[56] References Cited

U.S. PATENT DOCUMENTS

| | | | |
|---|---|---|---|
| 3,980,993 | 9/1976 | Bredart et al. | 395/325 |
| 4,245,344 | 1/1981 | Richter | 371/68.1 |
| 4,511,969 | 4/1985 | Koenig et al. | 379/90 |
| 4,853,846 | 8/1989 | Johnson et al. | |
| 4,864,496 | 9/1989 | Triole et al. | 395/325 |
| 4,897,786 | 1/1990 | Pimm et al. | 395/725 |
| 4,918,597 | 4/1990 | Krishnan et al. | 395/325 |
| 4,935,894 | 6/1990 | Ternos et al. | 395/325 |
| 4,982,321 | 1/1991 | Pantry et al. | 395/325 |
| 5,070,443 | 12/1991 | Priem et al. | 395/725 |
| 5,072,369 | 12/1991 | Theus et al. | 395/425 |
| 5,073,852 | 12/1991 | Siegel et al. | 395/700 |
| 5,086,499 | 2/1992 | Mutoni | 395/325 |
| 5,191,653 | 3/1993 | Banks et al. | 395/275 |
| 5,245,703 | 9/1993 | Hubert | 395/325 |
| 5,255,374 | 10/1993 | Aldereguia et al. | 395/325 |

Primary Examiner—Jack B. Harvey
Assistant Examiner—Ayaz R. Sheikh
Attorney, Agent, or Firm—Alfred W. Kozak; Mark T. Starr; Robert R. Axenfeld

[57] ABSTRACT

A system for controlling and routing messages and data received from dual system busses, through a bus interface unit, to a protocol translation logic means and to a processor in a central processing module connected onto a dual system bus network. The processor operates at a first clock rate and on a single-word communication protocol while the translation logic means operates at a second rate and multiple-word communication protocol. The processor and translation logic are destination modules which receive the benefit of the receiving control logic system. The receiving control logic system also services external modules on the system bus in order to receive data and control the routing of data to the destination modules. Destination modules which are busy and not ready will cause the system to inform the external transmitting modules that they must retry their transmission. The system also checks the quality of the data on the system busses and informs the processor when errors have been incurred, in addition to informing the originating modules when a transmitted message has been completed.

16 Claims, 20 Drawing Sheets

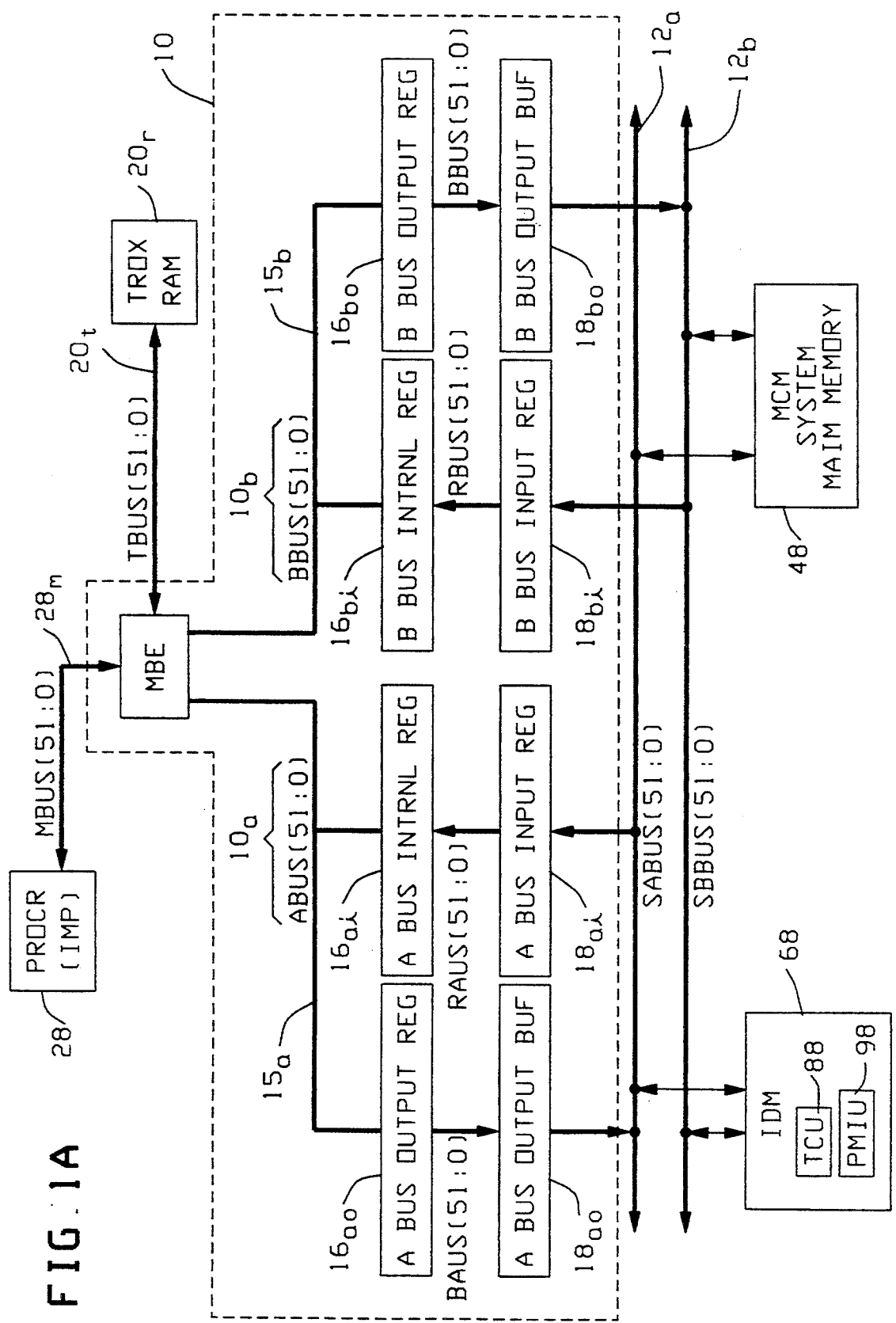

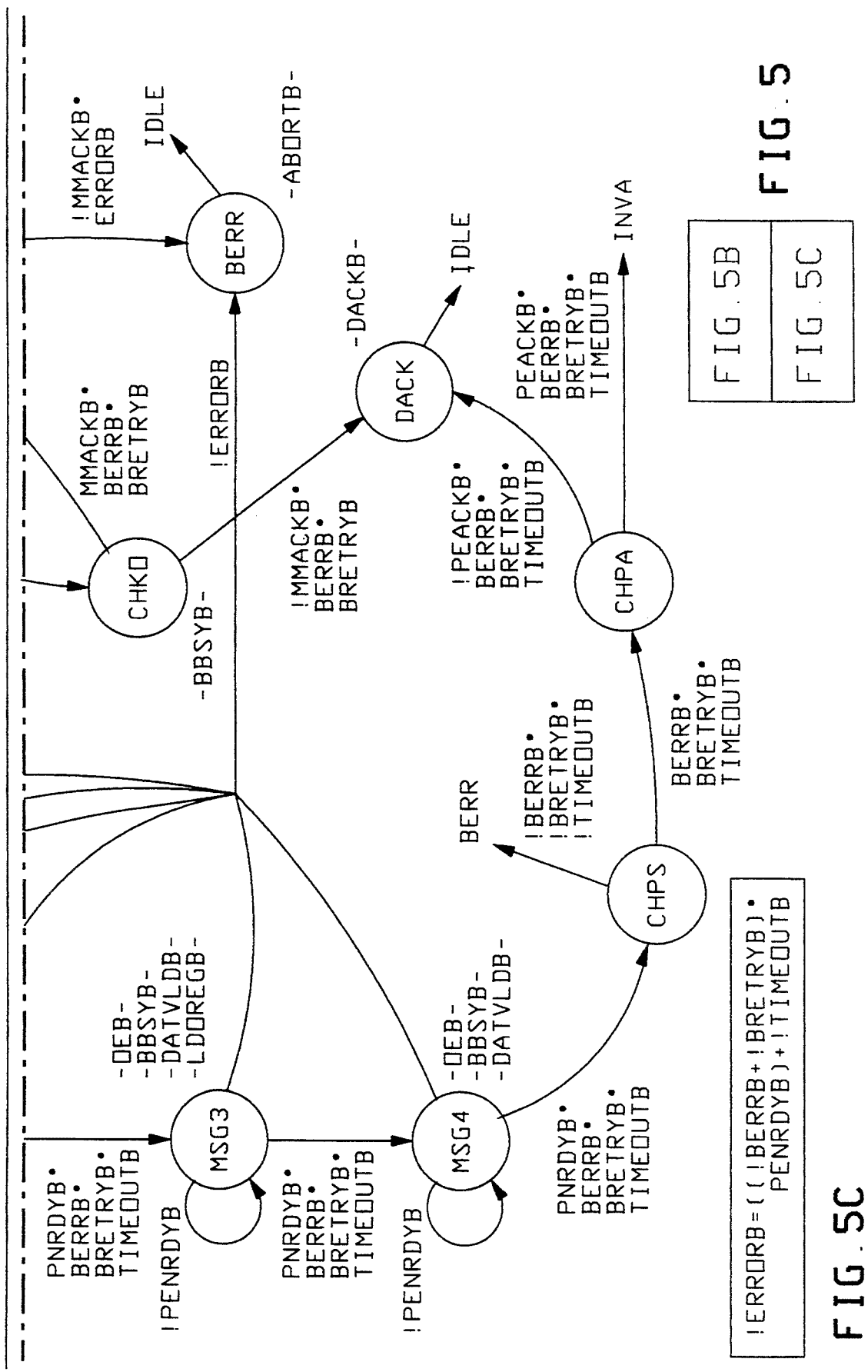

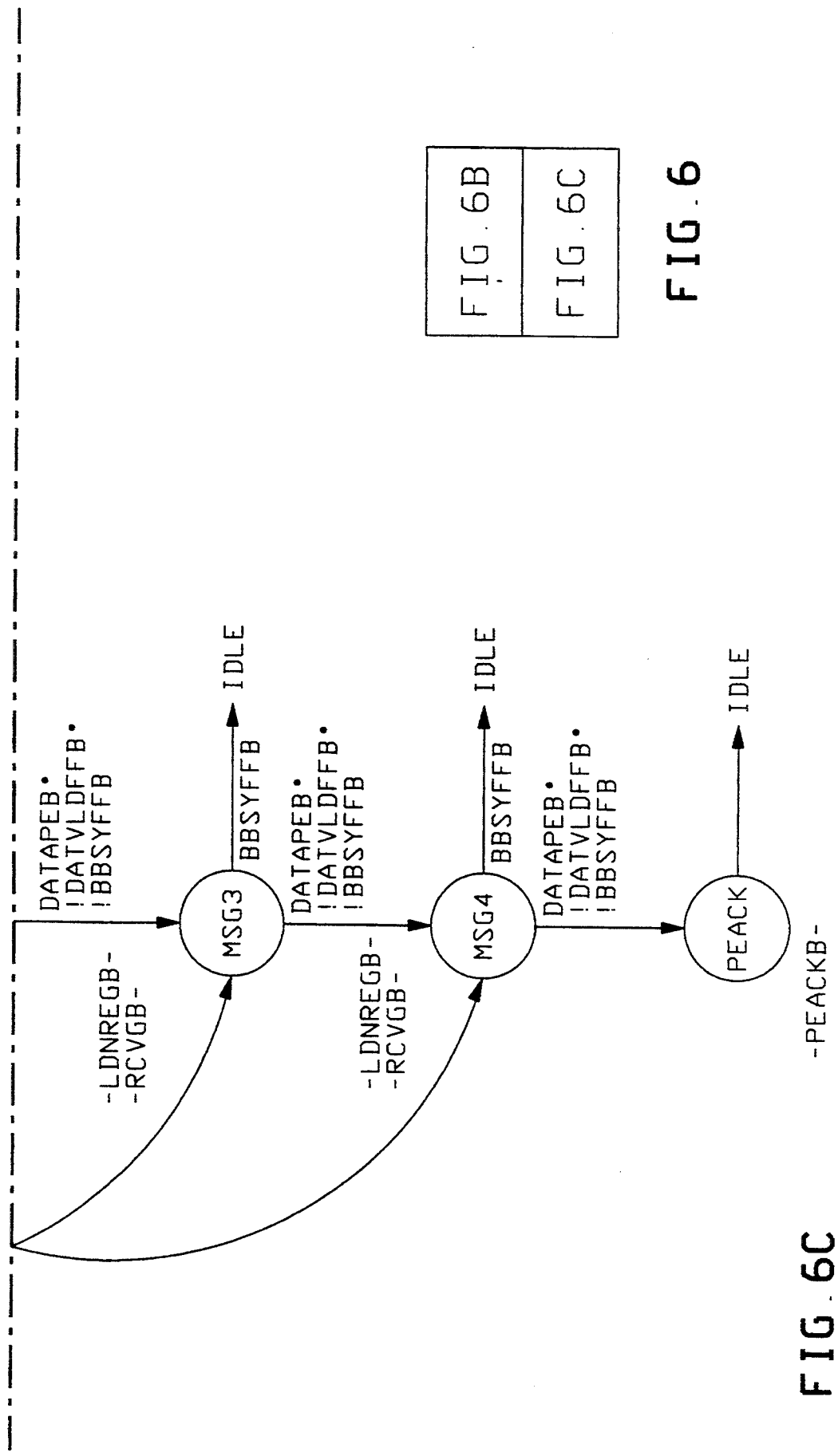

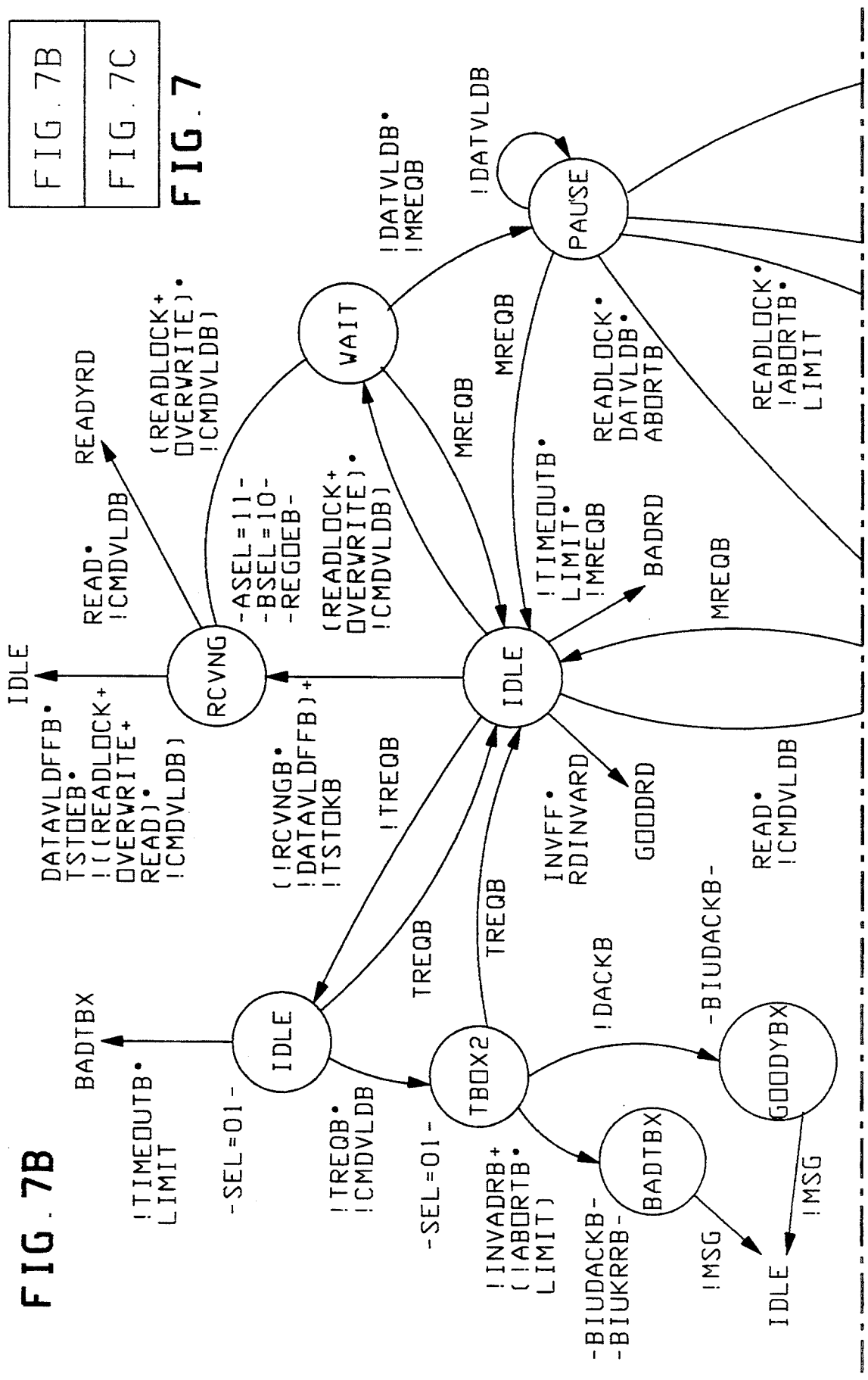

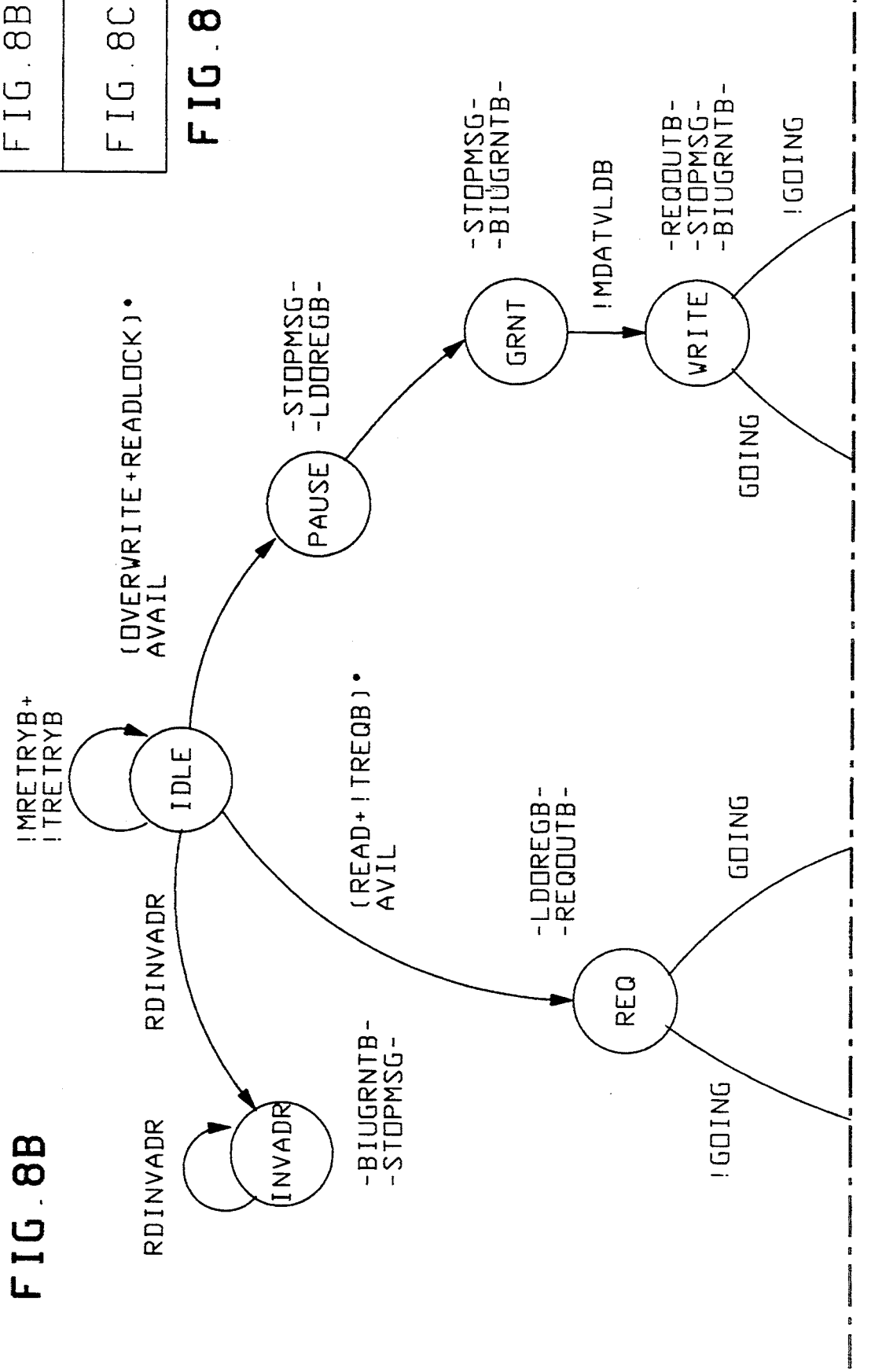

RECEIVING CONTROL LOGIC SYSTEM FOR DUAL BUS NETWORK

FIELD OF THE INVENTION

This disclosure relates to control mechanisms for handling of message data received from dual system busses in a computer network.

CROSS REFERENCES TO RELATED INVENTIONS

This application is related to a co-pending application entitled "Translator System For Intermodule Message Transfer" which was filed Feb. 14, 1992 as U.S. Ser. No. 07/837,174 and which is included herein by reference. This message transfer system provided communication between a single word protocol system and a multiple word protocol system each operating at different clock speeds. Also included by reference is a co-pending application entitled "Dual Bus Interface Unit" filed Oct. 16, 1992 as U.S. Ser. No. 07/963,304 which is now U.S. Pat. No. 5,404,462.

Another co-pending application included by reference is entitled "Programmable Timing Logic System for Dual Bus Interface" filed Oct. 16, 1992 as U.S. Ser. No. 07/961,744.

BACKGROUND OF THE INVENTION

Many problems arise when it is necessary to interconnect a processing unit with one or more system busses which permit intercommunication to other memory modules, other processors and to other input/output systems. It is always necessary that there be taken into account means for allowing flexibility within the system, such as allowing partitioning, and also providing for system speed and also for proper data transfer integrity and correction, in addition to redundancy which might be required should one area fail.

Prior art systems such as U.S. Pat. No. 4,622,630 entitled "Data Processing System Having Unique Bus Control Protocol" involve a single common bus which is used for communication of address and data information among various system components but which single bus is time multiplexed in order to provide periods for address transfer and periods for data information transfer.

U.S. Pat. No. 4,982,321 entitled "Dual Bus System" provides an architecture where two system busses are used but for entirely different purposes. Thus one bus is operable for memory operations while another bus is operable for input/output operations but there is no redundancy or means by which each of the busses can be used for each of the other functions. Thus this system could not operate on a single bus since it at all times requires two busses for operations.

U.S. Pat. No. 4,535,448 entitled "Dual Bus Communication System" involves a dual set of busses used to provide coupling between data services and voice services of a particular AT&T communication system designated the CS300. One bus functions on a time division basis for communication between port circuits while the other bus functions as a packet-switch data processing bus for interfacing system peripherals with port circuitry. Again here the busses in this system are dissimilar and are not interchangeable to provide any redundancy.

U.S. Pat. No. 4,933,846 entitled "Network Communications Adapter With Dual Interleaved Memory Banks Servicing Multiple Processors" involves dissimilar busses such that one bus functions for transferring addresses and the other functions for the transfer of data. Then further this system operates for multiple computers hooked together in a network and does not function as a single computer hooked into dual common redundant busses.

The architecture of the presently disclosed system involves a single computer system operating independently but providing dual redundant system busses which have bus interface units which permit the processor and another element designated as the transfer box unit (translation lock unit) to communicate to either one of the two or dual system busses so that data communication and transfers may occur between the processor and other auxiliary resources such as a memory module, an input/output module, or another processor module if so desired. Each one of the two system busses involved is a duplicate of the other so that the system can operate on any one of the busses should the other one fail. Another feature of the present system is the flexibility of expansion so that a second central processing module system can be integrated for communication on the dual busses and permit partitioning into concurrently operating systems.

In a network where a Central Processing Module and its internal processor function at a first specialized single word protocol and at a first clock rate while an attached translation logic unit and other resource modules connected to a set of dual system busses function using a multiple word protocol at a second clock rate, one problem that arises is the control and handling of word message data received on the dual busses and destined for the translation logic unit (T-Box or Transfer Box unit) and the processor. The present receiving control apparatus provides an organized arrangement for not only receiving word message data but insuring its integrity and efficient routing to the destined receiving modules.

A receiving control apparatus operates as part of a dual bus interface unit between dual system busses which carry messages destined for a protocol translation logic unit and/or a processor in a central processing module which functions on a different word protocol and different clock rate than the dual bus interface unit and the dual system busses.

The receiving control apparatus receives and routes incoming messages to the intended destination module which is either the translation logic unit or the Central Processing Module, but only after insuring the integrity and validity of the message. Additionally the apparatus can operate with either system bus that is available since the dual bus interface unit provides two communication channels to the Central Processing Module and translation logic unit.

The present system provides the architecture for a bus interface unit which cooperates with two identical system busses such that the system can operate on either bus alone or on both busses at the same time. A specialized protocol is implemented which allows the processor and its associated transfer box (translation logic unit) to send or receive information data to and from either or both of the busses. The translation logic unit translates the dual bus protocol to the processor protocol and vice versa for messages going between the processor and the dual system busses.

A particular feature of the bus interface unit is that it permits one system bus to do Reads and Writes to memory while allowing another system bus to carry messages from other module resources to be received by the processor. Additionally, since each of the two system busses are identical to each other, the failure of one bus would not shut down the system since the other bus would be fully capable of carrying out all the required operations since the processor unit can access both system busses at the same time or alternatively access any one of the system busses as required.

The system performance can be enhanced since during the time that Reads and Writes are being communicated to memory on one bus, the messages from other of the resource modules in the system can be received simultaneously on the other bus for action by the processor unit. Additionally because of the capability of two redundant system busses in the architecture, it is possible to partition the system into two independent operating machines operating under separate central processing modules (CPM's).

BRIEF DESCRIPTION OF THE DRAWINGS

FIG. 1A is a block diagram showing the disclosed bus interface unit and its relationship to the mainframe processor and the translation logic unit;

FIG. 3A is a drawing showing the transfer of message data from the translation logic unit through the bus interface unit to the system busses while

FIGS. 6B and 6C are a drawing of the function of the state machine operation for the bus interface unit receive logic;

FIGS. 7B and 7C are a diagram illustrating the functions of the return state machine operations;

FIGS. 8B and 8C are a drawing showing the functions of the timeout state machine.

GENERAL OVERVIEW

Figure 1:
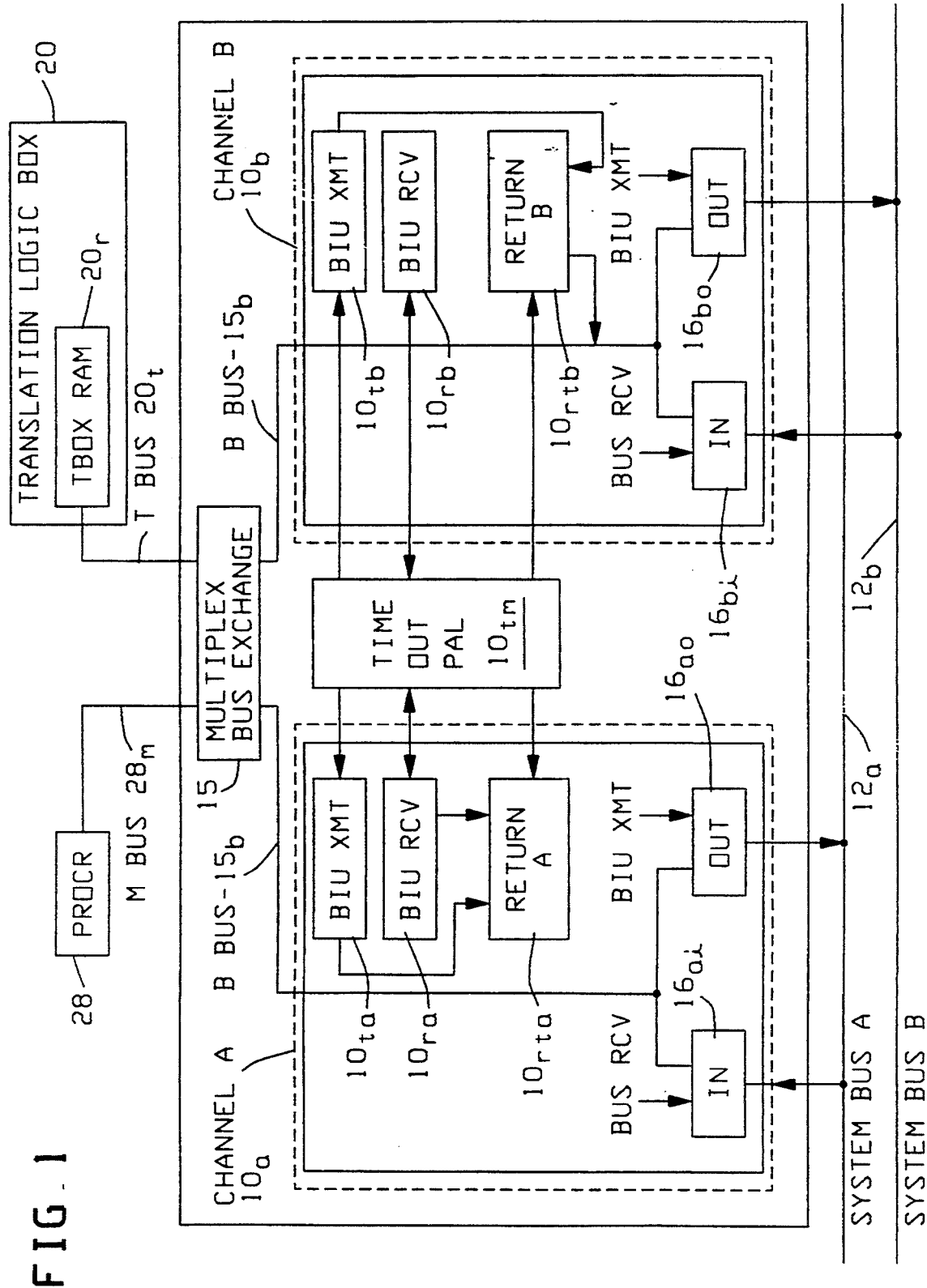
FIG. 1 is a diagram of the dual bus interface unit showing the two communication channels connecting the system busses and processor.
Figure 2:
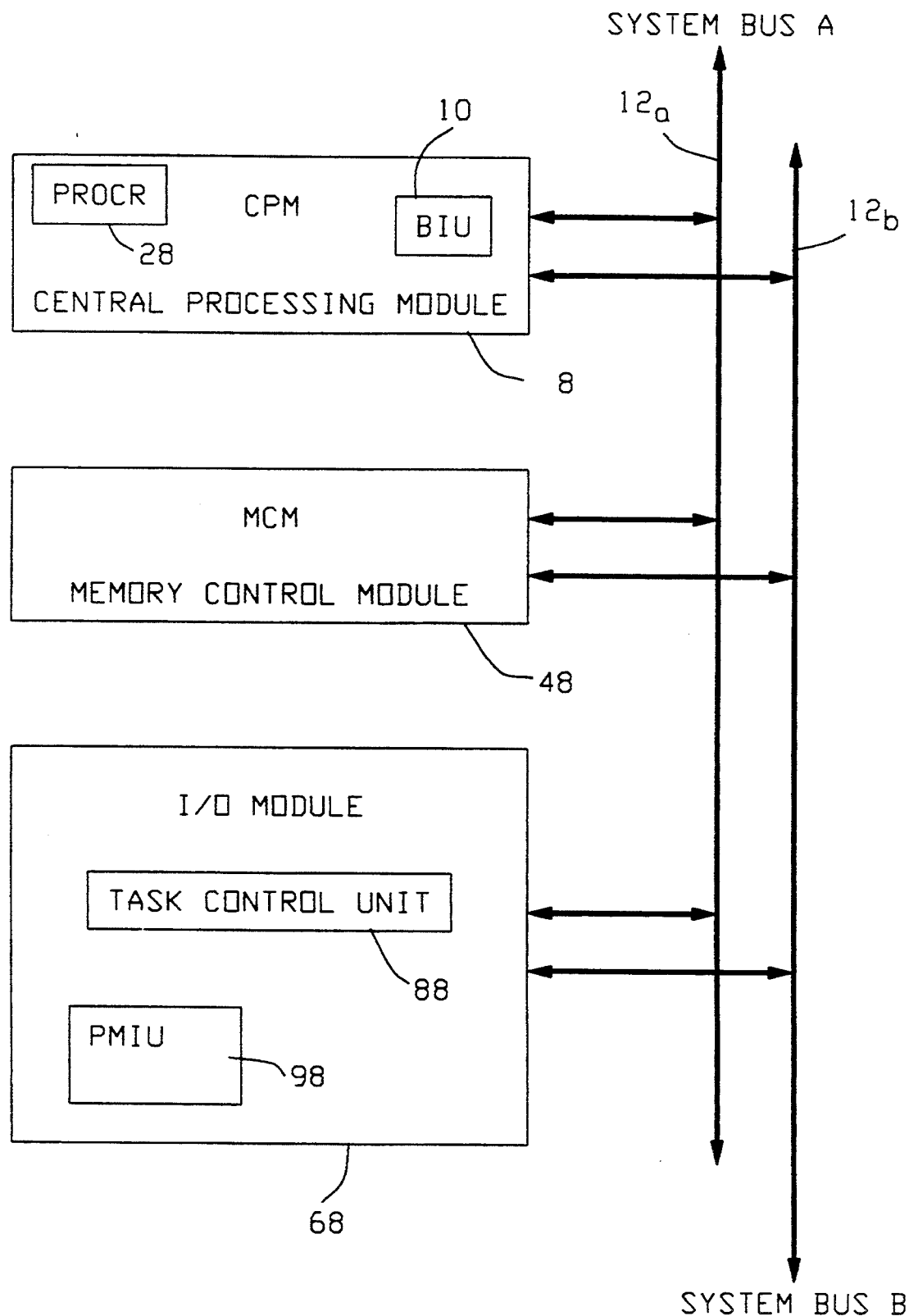
FIG. 2 is an overall system diagram showing the location of the bus interface unit in the central processing module and the two system busses connected to an input/output module which communicates to a task control unit, (TCU) and an external memory interface (PMIU)

A general view of the overall system involved is seen in FIGS. 1A and 2 wherein a pair of system busses $12_a$ and $12_b$ are each interconnected to a number of resource modules in the system. These resource modules include a central processing module 8 in which there resides a bus interface unit 10. This bus interface unit actually is a dual unit of which one operates with a system bus A, $12_a$ and the other unit cooperates with the system bus B, $12_b$. The additional resources connected to both of the system busses include a memory control modules (MCH) 48 (memory unit) and an input/output module 68 (IOM) which provides communication with various peripherals attached to the system in addition to a task control unit 88 (TCU) which controls the allocation of system tasks, and an external message interface unit 98 (PMIU) which connects to a system having non-compatible protocol operations.

Within the central processing module 8, this disclosure is particularly involved with the function and operation of the bus interface unit 10 having two channels $10_a$, $10_b$ operating in a dual capacity such that the system bus A, $12_a$ will have its own bus interface channel $10_a$ (FIG. 1) and also the other system bus B, $12_b$ will have its own dedicated bus interface channel $10_b$ (FIG. 1).

FIG. 1 is a generalized overall view of the dual bus interface unit 10 indicating its major components for integrating communication between dual systems busses and the Translation Logic 20 and Processor 28. The M bus 28m connects the bus exchange 15 to the mainframe processor 28 while the T bus $20_t$ connects the translation logic unit 20 to the bus exchange. Then Channel A, $10_a$ and Channel B, $10_b$ respectively use the A bus $15_a$ and B bus $15_b$ with a series of state machines $10_{ta}$, $10_{tb}$; $10_{ra}$, $10_{rb}$; and $10_{rta}$, $10_{rtb}$.

The bus interface unit 10 is further shown in FIG. 1A and functions to permit the processor 28 and the translation logic 20 to communicate with the dual bus system, that is to say system busses $12_a$ and $12_b$.

The processor 28 is capable of executing Reads or Writes to the system memory 48 of FIG. 1A. The mainframe processor 28 can also read the time of day from the input/output module 68 which houses the system clock. Thus there can be enabled, through the bus interface unit 10, a flow of data from either one of the system busses A or B, to and from the mainframe processor 28 and/or the translation logic unit 20.

SUMMARY OF THE INVENTION

A receiving control logic system is provided to control the inflow and distribution of data from dual system busses over to a processor and a translation logic unit. External modules including a main system memory can be connected to the dual system bus to provide commands, requests, and data to be delivered to a processor and/or a translation logic unit in the central processing module of the system.

The receiving control logic system involves dual state machines to service the dual system busses plus register means for holding and conveying commands and messages to destination modules in the central processing module.

An input register means allows messages/data to be simultaneously held from both or either one of the dual system busses for later transmittal to a multiple bus exchange to the destination modules which may be the processor or the translation logic unit. Data from main memory or commands can be sent directly to the processing unit without need for translation while messages which operate on a different protocol and at a higher clock rate must first be processed through the translation logic means for conveyance to the processor in the central processing module.

Provisions are made for notifying the destination modules that data is destined for them and also notification is given to the external originating modules that a destination module is busy and that the message must be retried for transmission by the originating external module. Additionally, the incoming data is checked and verified for transmission to the destination modules.

DESCRIPTION OF PREFERRED EMBODIMENT

Figure 1B:
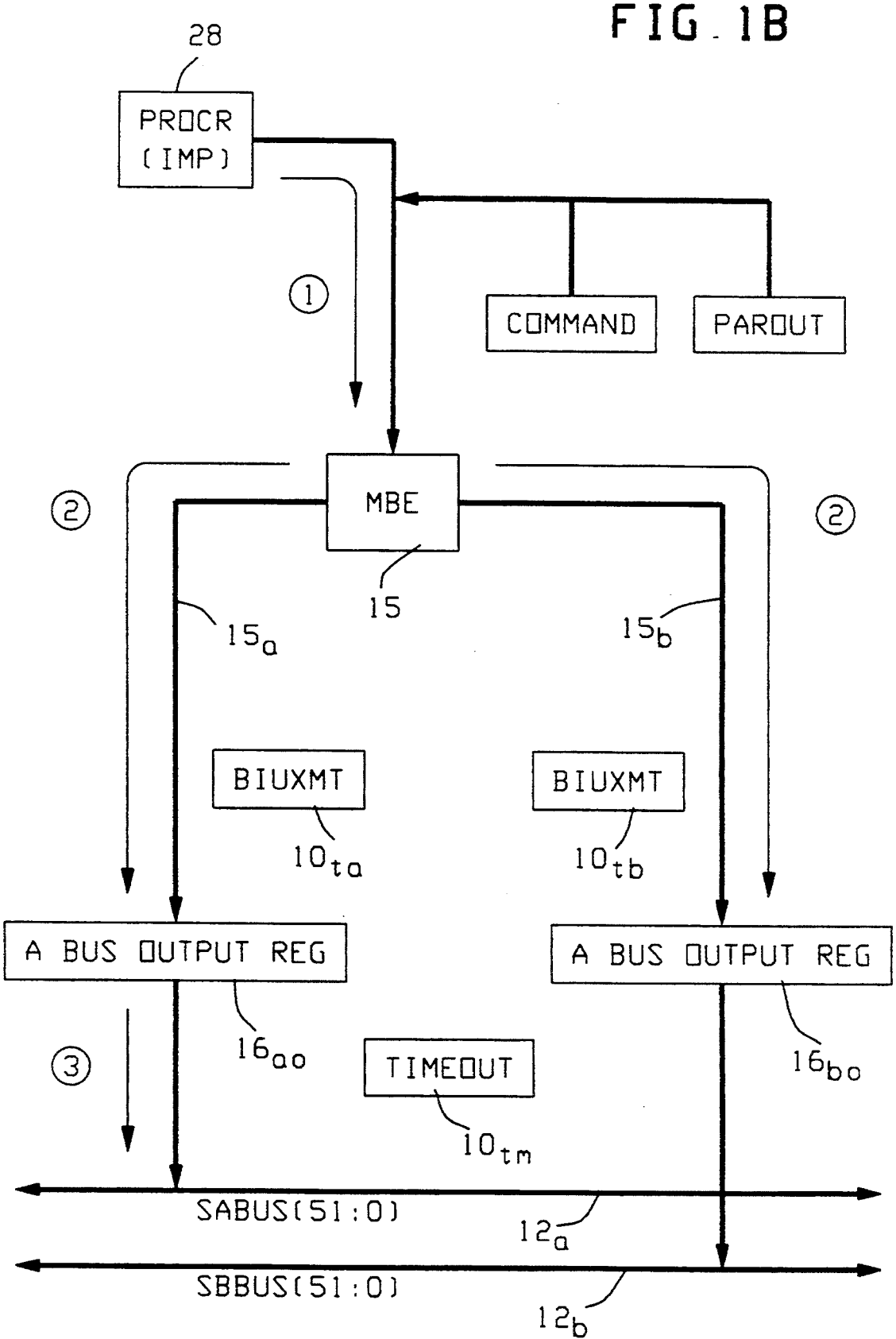
FIG. 1B is a drawing showing the function of the bus interface unit in communicating to the dual system busses.
Figure 1C:
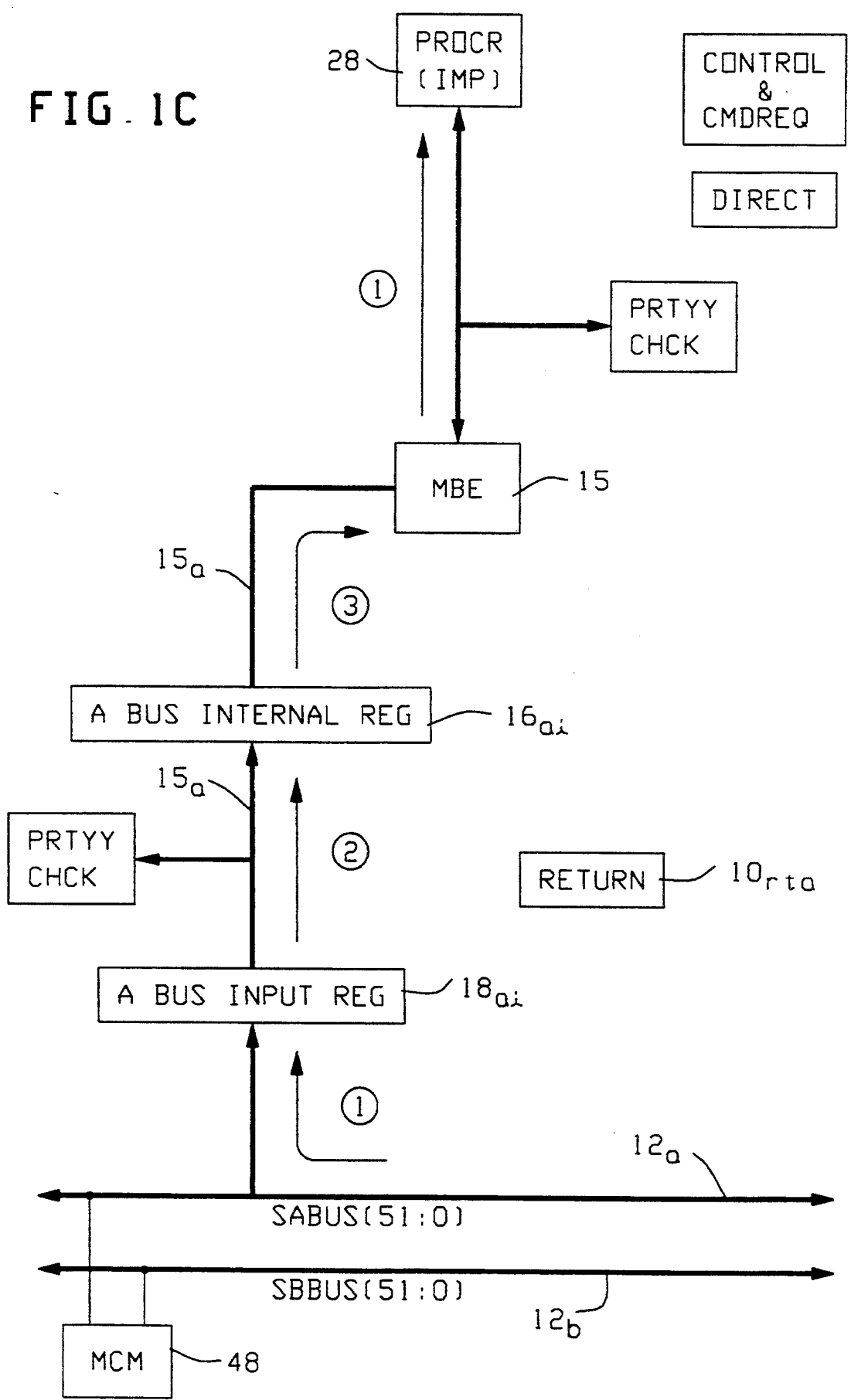
FIG. 1C is a schematic drawing showing the data flow being returned from memory and transferred from the system busses to the bus interface unit for conveyance to the processor.

The flow of communications and data provided by the bus interface unit 10 will be seen in FIG. 1B which shows data sent to the system busses $12_a$, $12_b$, and in FIG. 1C which shows data returned from the system bus to the bus interface unit 10 (BIU) transfer to the mainframe processor 28. As seen in FIG. 1B, there is indicated the transfer of data and commands from the processor 28 through the memory bus exchange 15 and thence to either the A bus output register $16_{a0}$ or to the B bus output register $16_{b0}$. These A and B bus registers respectively connect to the system A bus $12_a$ and the system B $12_b$.

Referring to FIG. 1A for initiating a "Read" from the memory unit 48, the processor interface logic in 28 sends a command to the bus interface logic unit 10 (BIU) along with a BIU 10 request signal. The command and the address are loaded into the output registers $16_{a0}$ and $16_{b0}$ for conveyance to both system busses. The Bus Interface Unit 10 will then make a request to the system bus arbitrators (in the Central Processing Module 8 of FIGS. 2, 4) for use of a system bus.

When a system bus (12a or 12b) has been granted access, the bus interface unit 10 executes all the necessary system bus protocols unique to the system bus 12 in order to send the command, the address (and data if there is required an "overwrite" to the system memory 48). If a "Read" cycle is commanded, then the requested data is returned from the memory 48, checked for parity, and the data is then sent to the central processor 28 FIG. 1A.

Likewise referring to FIG. 1C, it can be seen that data taken from the memory unit 48 can be transferred on either bus, but, in this case specifically on system bus A, $12_a$, over to the A bus input register $18_{ai}$ and thence on the A bus $15_a$ to internal register $16_{ai}$ from which it is conveyed to the memory bus exchange 15 for subsequent transfer to the processor 28.

Figure 3A:
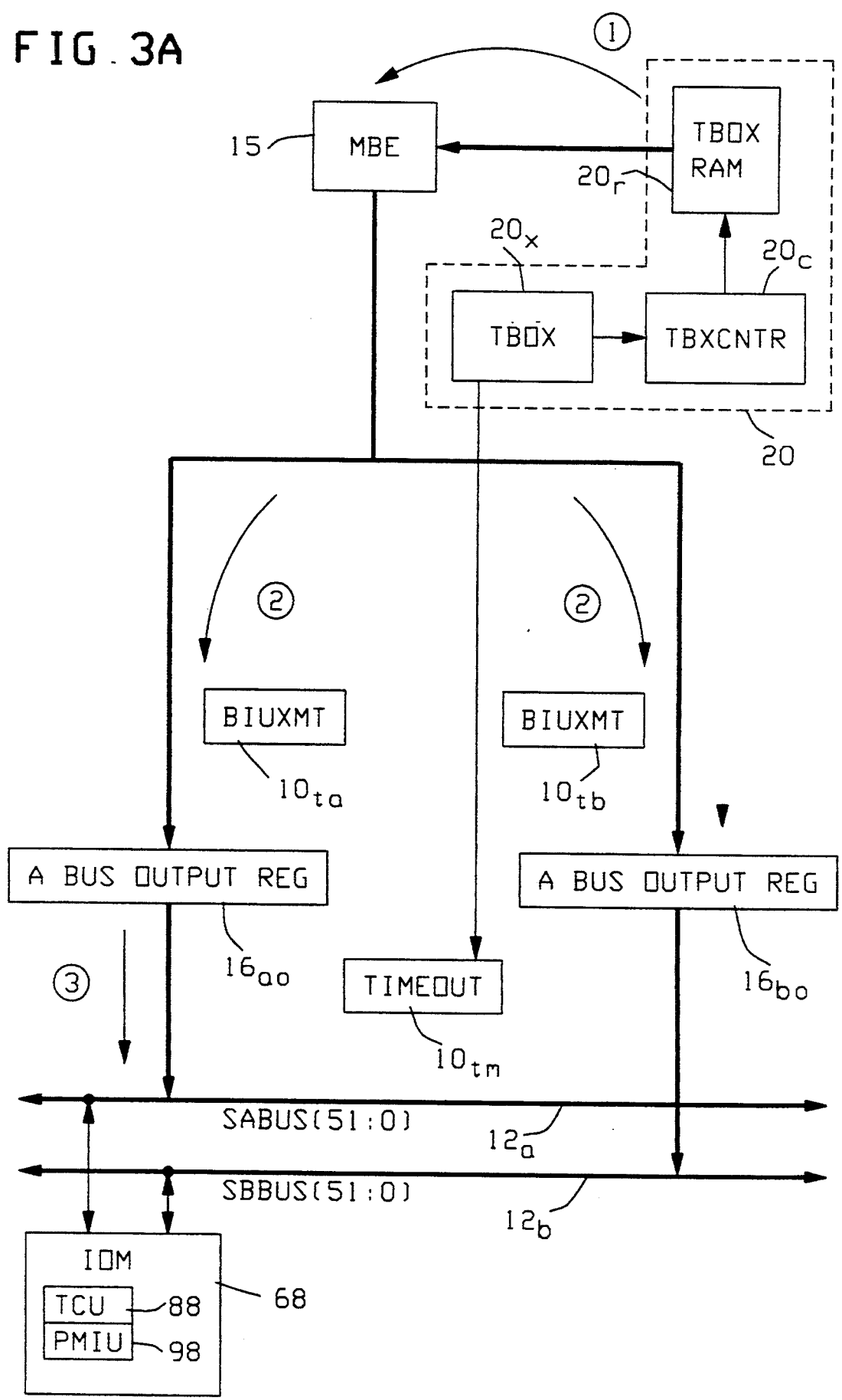
Figure 3B:
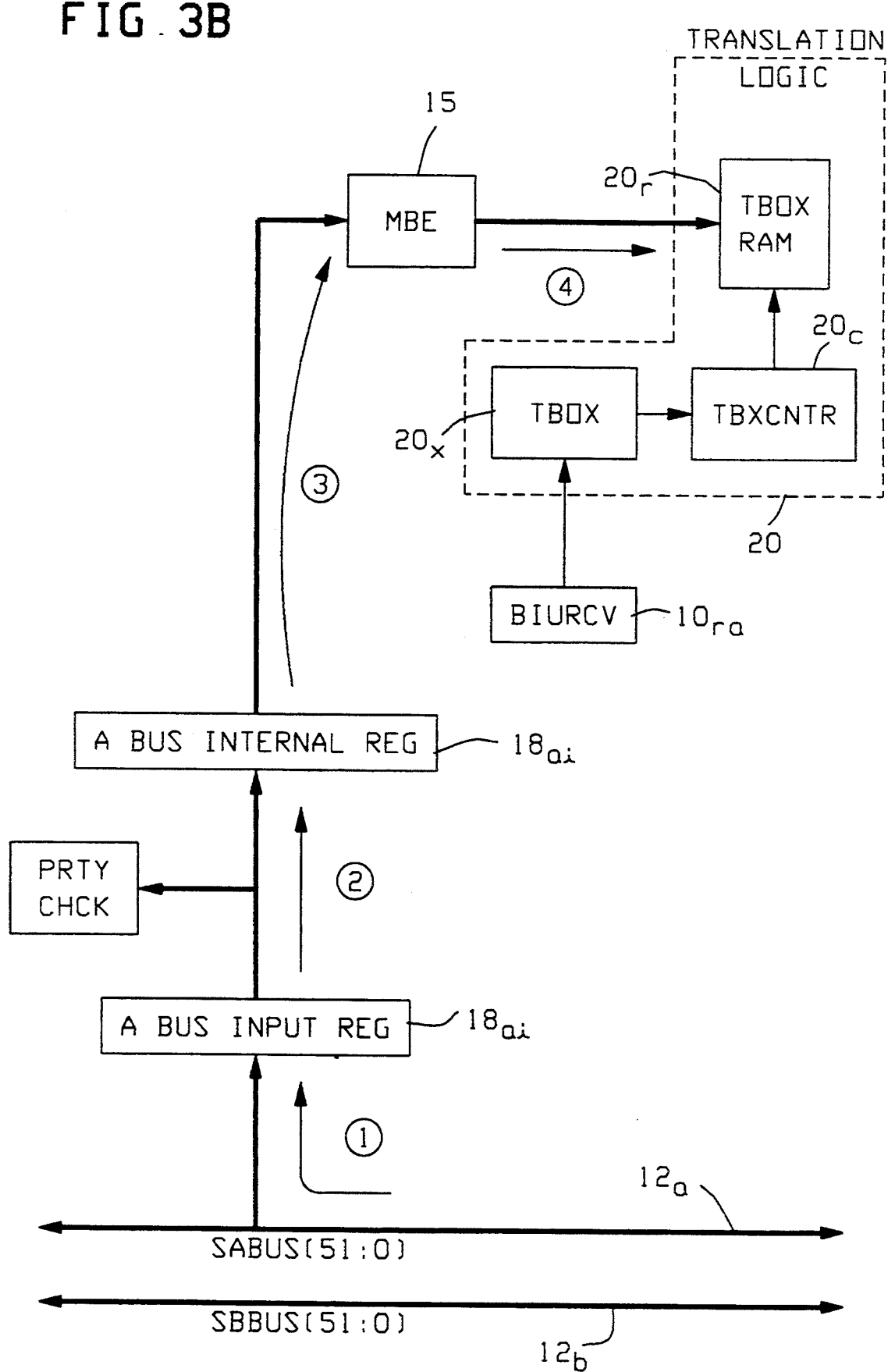
FIG. 3B shows the flow of data from the system busses through the bus interface unit into the translation logic unit.

Referring to FIGS. 3A and 3B there is seen the use of the translation logic unit 20. The translation logic 20 serves the function of providing an interface for handling the mainframe processor protocol which uses one 52-bit word and transfers this into 4 word messages for compatibility with an external digital system 98 using a different clock rate and protocol; thus the translation logic 20 of FIGS. 3A and 3B "Writes to" and also receives four word messages from the system busses $12_a$ and $12_b$. The data flow is seen in FIG. 3A as the transfer of four words from the translation logic 20 to the memory bus exchange 15 and thence to the A bus and B bus output registers ($16_{a0}$, $16_{b0}$) for conveyance to the system A bus $12_a$ and the system B bus $12_b$. This illustrates the output of message data from the transfer bus logic 20 to the system busses $12_a$, $12_b$. Thus the command, and the four data words, can then be transferred, for example, to an input/output module 68, and to the TCU 88 or PMIU 98.

When the translation logic 20 wants to send a message to the input/output module 68, a request is made to the bus interface unit BIU 10 (FIG. 1A). Once a grant is made by the bus interface unit, BIU 10, the message command word will be loaded into both of the BIU output registers $16_{a0}$, $16_{b0}$ for both system busses. The BIU 10 (Bus Interface Unit) will then make a request to the system bus arbitrators (in the CPM 8) for use of a system bus such as $12_a$ or $12_b$. When a system bus has been granted, the BIU 10 will execute all necessary system bus protocols which are required by the bus to send the command and also the four data words to the input/output module IOM 68.

The BIU 10 (Bus Interface Unit) continuously monitors the system busses for messages which are addressed to the central processing module 8 (CPM). The system bus is continually loading data into the input registers $18_{ai}$, $18_{bi}$ of the BIU 10.

A determination is made of data on the system bus if what was loaded was a "message" and if this message was addressed to the processor 28. If such is the case, then several actions can be forthcoming.

If the BIU 10 is currently "not ready" to accept a message (such as waiting for Read data to be returned on the other system bus), then certain signals such as a "not ready" signal (A-PENRDY-B or B-PENRDY-B) will be asserted into the message. PENRDY denotes "processing element" not ready.

The message transfer will pause until the "not ready" signal goes away and then the BIU 10 will then load it into the translation box logic unit 20.

The BIU 10 may also issue a signal designated A-RETRY-B or B-RETRY-B to the message, if it is currently unable to process the message. Finally, when it can accept the message, and check the parity and send the four data words to the translation logic 20, the BIU 10 will do so. The BIU 10 will execute all necessary system bus protocols unique to the system bus in order to facilitate the message transfer.

Figure 4:
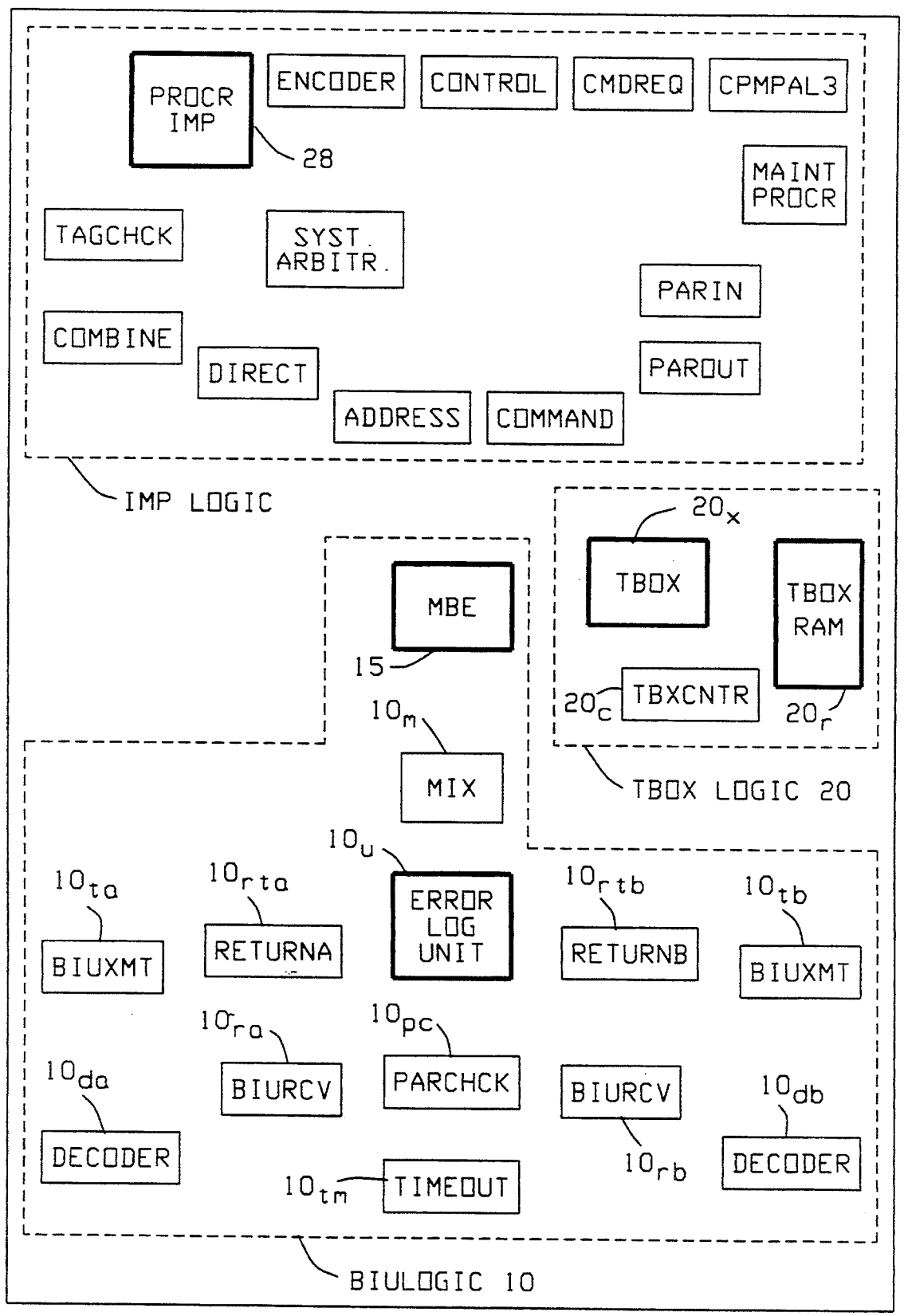
FIG. 4 is schematic block drawing showing the main circuitry units involved in the central processing module (CPM), including the translation logic and in the bus interface unit logic.

FIG. 4 is a generalized block diagram showing the relationship of the logic units in the central processing module 8, which holds the translator logic 20 and the bus interface unit 10. In addition, FIG. 1, also shows this relationship indicating how the two channels A and B ($15_a$, $15_b$) are organized.

The central processing module 8 contains the mainframe processor 28 (IMP) and a number of other generalized functional blocks shown in FIG. 4. Connected to the processor logic of the CPM 8 is the translator logic 20. As shown in FIG. 4, this involves the translator box $20_x$, the translator box controller $20_c$, and the translator box memory RAM $20_r$.

The logic unit designated as the bus interface unit logic BIU 10 is shown in a generalized block form with blocks indicating the Mix unit $10_m$, the Error Logging unit $10_u$, the Parity Check Unit $10_{pc}$, and the Timeout Unit $10_{tm}$. Additionally, there are shown the return unit state machine RETURNA designated $10_{rta}$ and also the RETURN B unit state machine, $10_{rtb}$. Additionally are shown the bus interface transmit programmable array logic such as $10_{ta}$ and $10_{tb}$ and the bus interface receive programmable array logic designated $10_{ra}$ and $10_{rb}$. Each system bus A and system bus B will connect to a decoder $10_d$ ($10_{da}$ and $10_{db}$) which provides decoding functions for the system busses $12_a$ and $12_b$.

The Mix Unit, $10_m$, of FIG. 4 combines control signals from both system busses into one signal for the processor control logic unit in CPM 8. It also functions to stop incoming messages to the CPM 8 from a system bus, if the CPM 8 is not ready to accept the message.

The Decoder Units $10_{da}$ and $10_{db}$ Of FIG. 4 function to monitor the system busses, $12_a$ and $12_b$ to notify the BIU 10 that a bus message is designated for the host CPM 8. It also functions to see if a "Write Command" on the system bus should be invalidated in cache memory as being no longer valid data.

The mainframe processor control logic in the CPM 8, FIG. 4, will receive completion status signals from a system bus when a given command cycle has been completed.

The multiple bus exchange 15 allows the mainframe processor 28, the transfer logic unit 20 and the BIU 10 to exchange data. Thus the processor 28 can read or write the transfer unit 20 or read from or write data to the BIU 10. Control lines determine which modules are sources and which are receiving units.

BUS INTERFACE UNIT-TRANSMIT STATE MACHINE (BIU-XMT $10_{ta}$ and $10_{tb}$)

The bus interface unit logic 10 will be seen to have two programmable array logic state machines, one for each channel for each of the system busses. These are designated as transmit (XMT) state machines which provide the functions seen in FIGS. 5A and 5B.

The BIU-XMT programmable array logic is a state machine which may be implemented by use of a Signetics chip PLUS405 running at 16 megahertz. Its main function is to handle the system bus protocols for carrying out the various system bus operations which are initiated by the processor 28 (IMP) or transfer box logic 20. There is one bus interface unit transmit PAL (BIU-XMT) for each system bus.

Figure 5A:
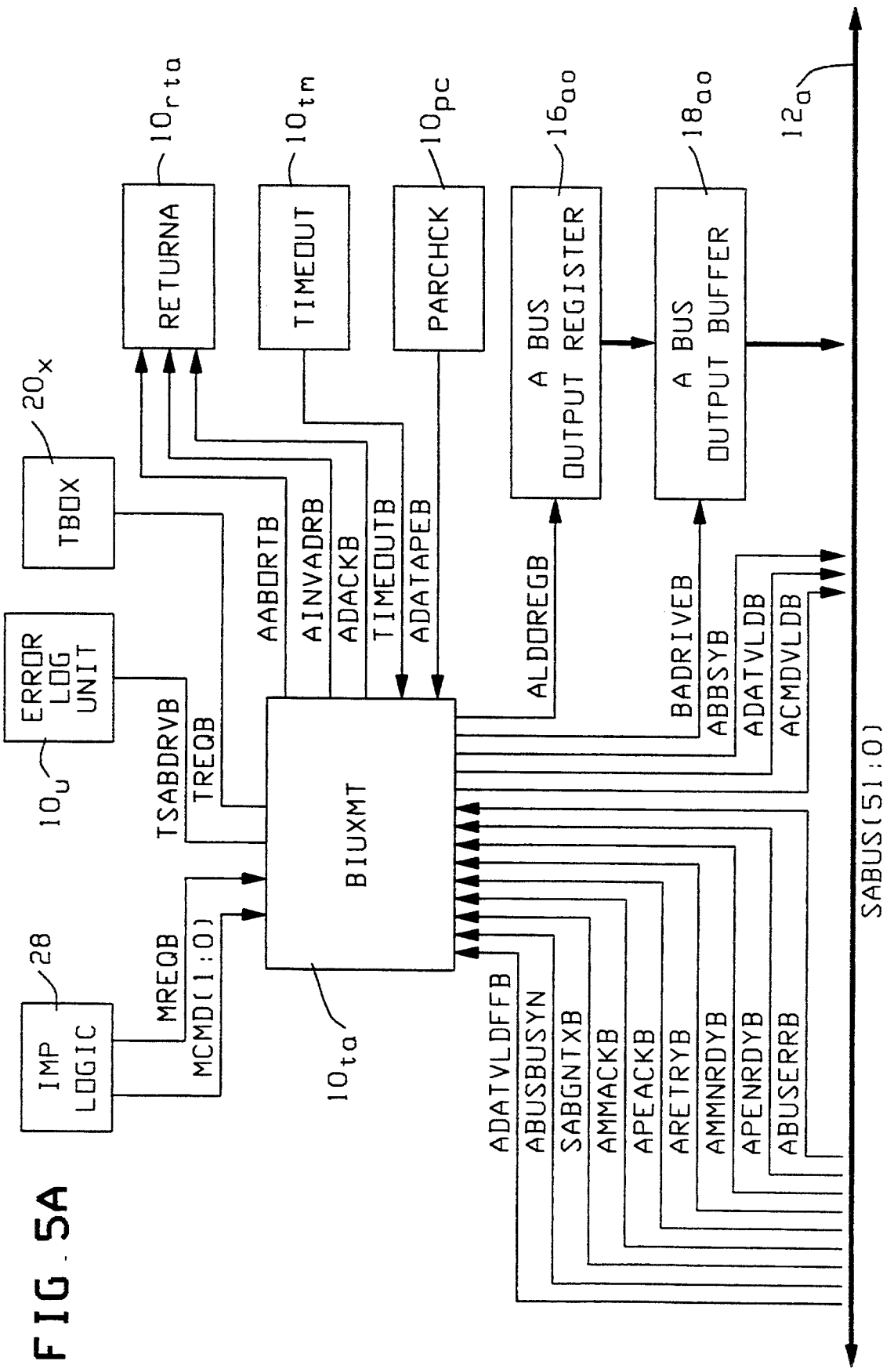
FIG. 5A is a block drawing of the bus interface unit transmission programmable array logic which is indicated in more detail through use of FIGS. 5B and 5C which indicates the functions of the bus interface unit-transmit state machine.

FIG. 5A is a block diagram of the bus interface unit transmit programmable array logic unit (BIU-XMT) and the signals which interface with it. It should be noted that the subsequent designation of single names will often involve a small "x" which indicates that the signal exists for both the A and the B busses $12_a$ and $12_b$. For example, x-RETRY-B refers to two signals, that is to say A-RETRY-B and also B-RETRY-B. The use of a small "n" is used to indicate a number so that for instance - - - MSGn represents MSG1. MSG2, and so on. MSGn stands for message number.

FIG. 5A is a drawing illustrating the transmit function of the bus interface unit and its relationship to other modules in the system. FIG. 5A shows how various signals from the processor logic 28, the Error Logging unit $10_u$ and the translator box logic 20 are sent to the bus interface unit programmable transmit logic $10_{ta}$. The bus transmit programmable array logic $10_{ta}$ receives a series of signals from the A Bus $12_a$ and also outputs a series of signals to the A Bus $12_a$ as shown in the drawings of FIG. 5A. Also the transmit unit $10_{ta}$ provides signals to the A Bus output register $16_{a0}$ and to the A Bus output buffer $16_{a0b}$.

Another series of output lines from the bus interface unit transmit programmable array logic (BIU_XMT) $10_{ta}$ is fed to the Return A logic $10_{rta}$. The timeout unit $10_{tm}$ and the parity check unit $10_{pc}$ provide signal lines into the bus interface unit transmit programmable logic $10_{ta}$.

FIG. 5A basically indicates commands and data transfers from the processor 28 (IMP) or from the transfer box $20_x$ to the system busses $12_a$, $12_b$. In this manner the transfer box messages can be serviced for transfer to the busses $12_a$ and $12_b$. When the command phase of a bus operation is initiated, a system bus signal will permit commands to be transmitted from the IMP processor 28 or the transfer box $20_x$.

Thus the mainframe processor 28 and the transfer box logic 20 are capable of sending and receiving messages via a dual system bus architecture which caries message protocols different from the message protocols used by the mainframe processor.

The attached Table I will illustrate how the mainframe processor 28 provides message commands and how each command is encoded when it is sent to the bus interface unit-transmit programmable array logic $10_{ta}$.

TABLE I

| COMMAND ENCODINGS | |
|---|---|
| PROC IMP Operation | M CMD(1:0) (M Bus 28 m, FIG. 1) |
| Read | 00 |
| Read Next Code | 00 |
| Readcode | 00 |
| Fetchcode | 00 |
| Read TOD | 01 |
| Overwrite | 10 |
| Send Message | 10 |
| Readlock | 11 |

The various input and output signals shown in FIG. 5A are defined in the following lists.

INPUTS (FIG. 5A) BIU-XMT PAL

System Bus Retry($x$_RETRY_B)
　　Source: $S_x$_RETRY_B buffered by a Receiver
　　Dest: BIU-XMT PAL
　　Polarity: Active Low
　　Type: Unidirectional
　　If the BIU-XMT PAL is executing an operation to the system bus and this signal is asserted when there are no active "not ready's", the state machine will abort the operation and if the retry limit has not been met, will retry the operation at a later time.
System Bus Error ($x$_Berr_B)
　　Source: $S_x$_Berr_B buffered by a Receiver
　　Dest: BIU-RCV PAL, BIU LCA
　　Polarity: Active Low
　　Type: Unidirectional
　　This signal indicates that some active receiver on the system bus has detected a parity error.
Memory Module Not Ready ($x$_MMNRDY_B)
　　Source: $S_x$_MMNRDY_B buffered by a Receiver
　　Dest: BIU-RCV PAL, BIU-XMT PAL
　　Polarity: Active Low
　　Type: Unidirectional
　　If the BIU-XMT PAL is executing a system bus operation which reads or writes from memory, this signal will cause the state machine to pause its execution until the signal is no longer active.
Processing Element Not Ready ($x$_PENRDY_B)
　　Source: $S_x$_PENRDY_B buffered by a Receiver
　　Dest: BIU-XMT, TAG Check (LOADORG Control), BIU-RCV
　　Polarity: Active Low Type: Unidirectional If the BIU-XMT PAL is executing a system bus operation which reads from the PMIU or sends out a message, this signal will cause the state machine to pause its execution until the signal is no longer active.

PROCR (IMP) Command (M_CMD016, M_CMD116)
  Source: CMDREQ PAL synchronized in BIU Error Log Unit
  Dest: BIU-XMT PAL, TIMEOUT PAL, RETURN PAL
  Polarity: Encoded Bus
  Type: Unidirectional, Encoded Commands
  These two signals contain the bus operation encoding from the IMP interface logic. Table I . indicates values.

System Bus Busy ($_x$_BUSBUSY_B)
  Source: $S_x$_BBSY_B buffered by a Receiver
  Dest: Arbiter, BIU-XMT
  Polarity: Active Low
  Type: Unidirectional
  This signal indicates that there is an operation which is active on the system bus.

System Bus Grant ($S_x$_BGNT$_x$_B)
  Source: System Bus Arbiter
  Dest: TIMEOUT, BIU-XMT
  Polarity: Active Low
  Type: Unidirectional
  This signal, validated with $_x$_BUSBUSY_B, indicates that the requesting CPM has been granted the indicated system bus for a bus operation.

Bus Operation Timeout (TIMEOUT_B)
  Source: TIMEOUT PAL
  Dest: BIU-XMT PAL, TBOX, RETURN PAL
  Polarity: Active Low
  Type: Unidirectional
  This signal is used to determine when a bus operation has timed out. This can occur while waiting for a system bus grant after a system bus request, waiting for a not ready signal to go inactive while executing a bus operation, or waiting for data to be returned while executing a read type operation.

TBOX BIU Request (T_BREQ_B)
  Source: TBOX
  Dest: BIU-XMT PAL, Error Log, TIMEOUT PAL, TAGCHCK PAL, RETURN PAL
  Polarity: Active Low
  Type: Unidirectional
  This signal becomes active when the TBOX wishes to send a message to a system bus.

Data Parity Error (_DATAPE_B)
  Source: PARCHCK PAL
  Dest: BIU-XMT PAL, BIU-RCV PAL, Error Log, DECODER PAL, RETURN PAL
  Polarity: Active Low
  Type: Unidirectional
  This signal is asserted whenever a parity error is detected on one of the system buses.

Test Bit (TS_XBDRV_B)
  Source: Error Log Unit
  Dest: BIU-XMT PAL
  Polarity: Active Low
  Type: Unidirectional
  This signal is a test bit used during board debug. It causes the BIU-XMT PAL to assert the signals B_DRIVE_B and x_BBSY_B.

Processing Element Acknowledge ($_x$_PEACK_B)
  Source: $S_x$_PEACK_B buffered by Receiver.
  Dest: BIU-XMT PAL, Error Log
  Polarity: Active Low
  Type: Unidirectional
  This signal is asserted by the PMIU 98 when it has successfully accepted a message from the CPM or is acknowledging that it has received a read time of day, RTOD command.

Memory Module Acknowledge ($_x$_MMACK_B)
  Source: $S_x$_MMACK_B buffered by Receiver.
  Dest: BIU-XMT PAL, Error Log Unit
  Polarity: Active Low
  Type: Unidirectional
  This signal is asserted by memory to acknowledge that it has received a valid command.

IMP BIU Request (M_BREQ16_B)
  Source: CMDREQ PAL synchronized in Error Log
  Dest: BIU-XMT PAL, TIMEOUT PAL, RETURN PAL
  Polarity: Active Low
  Type: Unidirectional
  This signal validates the IMP Command bits.

System Bus Retry ($_x$_RETRY_B)
  Source: $S_x$_RETRY_B buffered by Receiver.
  Dest: BIU-XMT PAL
  Polarity: Active Low
  Type: Unidirectional
  If the BIU-XMT PAL is executing a system bus operation and this signal is asserted by the receiving module, the operation will be aborted and, if the retry limit has not been exceeded, the operation will be retried at a later time.

System Bus Error ($_x$_Berr_B)
  Source: Sx_Berr_B buffered by Receiver.
  Dest: BIU-XMT PAL, BIU-RCV PAL, Error Log Unit
  Polarity: Active Low
  Type: Unidirectional
  This signal indicates that some active receiver on the system bus has detected a parity error.

OUTPUTS (FIG. 5A)

System Bus Command Valid ($_x$_CMDVLD_B)
  Dest: System Bus Driver
  Polarity: Active Low
  Type: Unidirectional
  Indicates that there is a valid system bus command on the system bus.

System Bus Data Valid ($_x$_DATVLD_B)
  Dest: System Bus Driver
  Polarity: Active Low
  Type: Unidirectional
  Indicates that there is a valid data word on the system bus.

Output Buffer Drive (B_DRIVE_B)
  Dest: Output Buffers through driver
  Polarity: Active Low
  Type: Unidirectional
  Activates the output buffers to the system bus.

XMIT PAL Busy ($_x$_BBSY_B)
  Dest: System Bus through driver, DECODER PAL, Test Register
  Polarity: Active Low
  Type: Unidirectional
  Indicates that the BIU-XMT PAL is driving "bus busy" onto the system bus.

Operation Abort ($_x$_ABORT_B)
  Dest: Error Log Unit, RETURN PAL

Polarity: Active Low
Type: Unidirectional
Indicates that the current operation by the BIU-XMT PAL is being aborted because of a bus error, a retry, or a timeout.

Invalid Address ($_x$_INVADR_B)
Dest: Error Log Unit, RETURN PAL
Polarity: Active Low
Type: Unidirectional
If this signal is active, the current operation being performed resulted in the destination system bus receiver not acknowledging the operation.

Load Output Register ($_x$_LDOREG_B)
Dest: Output Register via TAGCHCK PAL
Polarity: Active Low
Type: Unidirectional
Causes the output registers to be loaded with the data on the A or B internal buses ($15_a$, $15_b$).

Data Acknowledge ($_x$_DACK_B)
Dest: RETURN PAL
Polarity: Active Low
Type: Unidirectional
This signal indicates that the current bus operation has completed successfully.

Figure 5B:
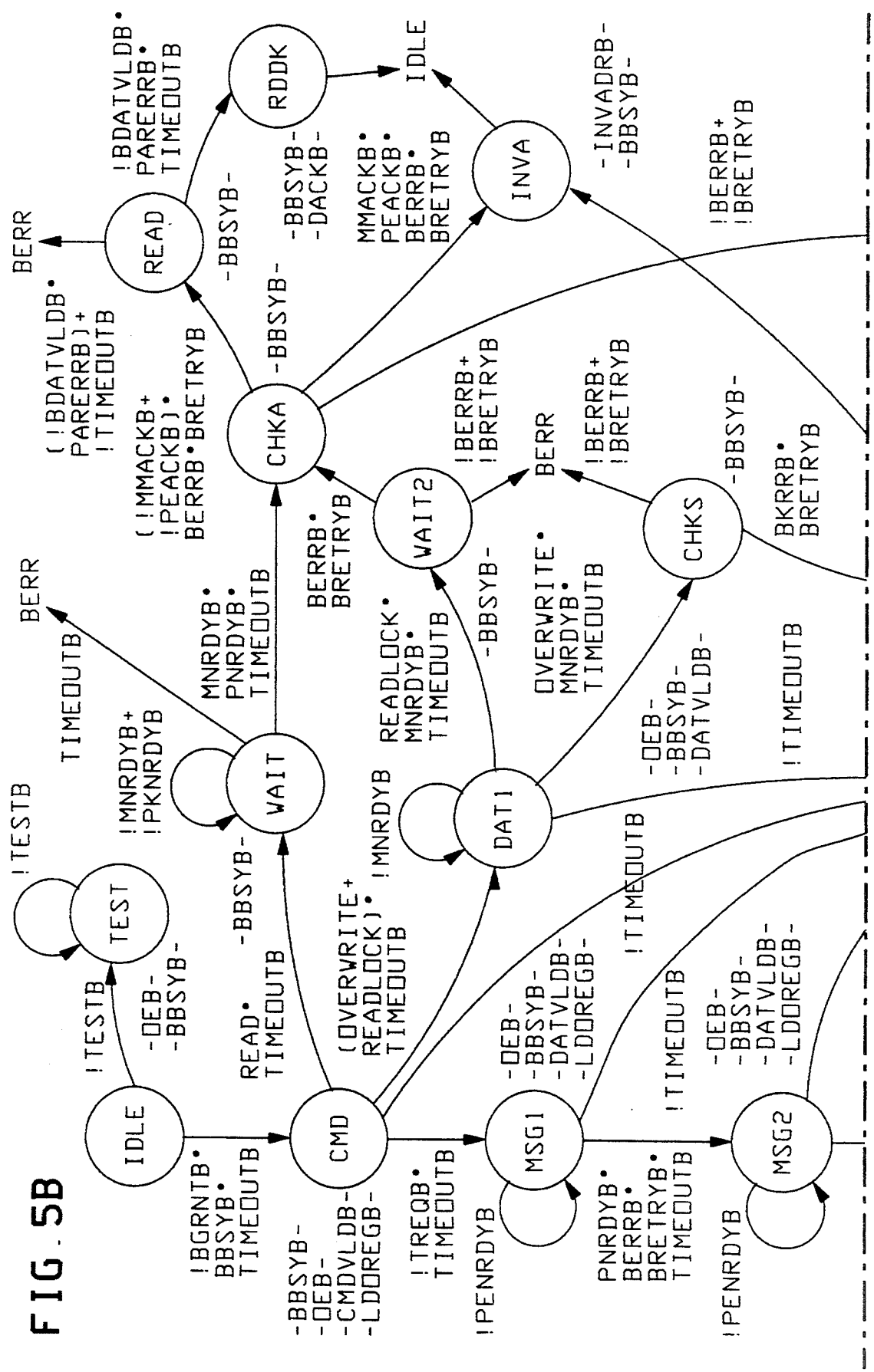

BIU-XMT States (FIG. 5B): There are twenty operative states associated with this BIU-XMT state machine. It is to be noted that the bus interface unit transmit programmable array logic, $10ta$ will operate as a state machine. This is indicated in FIG. 5B which shows the various routines which can be provided by the bus interface transmit unit $10_{ta}$. Similarly this set of routines is also provided by the second bus interface transmit programmable array logic $10_{tb}$ which performs the same set of automatic functions shown in FIG. 5B.

The following list explains the various circular block acronyms shown in FIG. 5B to indicate the functions that they perform.

IDLE When the reset signal (405-RESET X) is applied to the BIU-RCV PAL, the internal state machine will go to the IDLE state. While in this state, all output signals are inactive.

CMD This indicates the command phase of a bus operation. In this state the active outputs are $_x$_BBSY_B, which indicates a valid operation is occurring on the system bus, $B_x$_DRIVE_B, which output enables the output registers to the system bus; $_x$_CMDVLD_B, which indicates that a valid bus command is on the system bus; and $_x$_LDOREG_B, which loads the output registers with the data for the data phase of an operation.

MSGn (For values of n equal to 1, 2, or 3) During these states the data words of a message are being sent out on the system bus. The active outputs are $_x$_BBSY_B indicating the system bus is busy; $B_x$_DRIVE_B, output enabling the output drivers; $_x$_LDOREG_B, which loads the next data word to be sent out in the message; and $_x$_DATVLD_B, which indicates there is valid data on the system bus.

MSG4 This state is similar to the above message states except $_x$_LDOREG_B is no longer active.

CHPS This is a one clock state waiting to look for $_x$_PEACK_B from the message destination module. There are no active outputs. PEACK denotes Processing Element Acknowledgement.

CHPA The state machine is looking for the xPEACK_B from the destination module during this state. There are no active outputs.

DAT1 This is the data phase state during overwrite and readlock operations. The active outputs are $_x$_BBSY_B, $B_x$_DRIVE_B, and $_x$_DATVLD_B.

WAIT During a read operation the state machine will pause here until $_x$_MMNRDY_B and $_x$_PENRDY_B are both inactive. The only active output is $_x$_BBSY_B.

WAIT2 During a readlock operation the state machine will pause here one clock before looking for an acknowledge signal from the destination module. The only active output is xBBSY_B.

CHKS During an overwrite operation the state machine will pause here one clock before looking for an acknowledge signal from the destination module. The only active output is $_x$_BBSY_B.

CHKA At this point in a read or a readlock operation the state machine is looking for the signal $_x$_MMACK_B or $_x$_PEACK_B from the destination module. The only active output is $_x$_BBSY_B.

CHKO At this point in an overwrite operation the state machine is looking for the signal, $_x$_MMACK_B from the destination module. The only active output is $_x$_BBSY_B.

READ The state machine will pause in this state during a read or readlock operation waiting for valid data to come back from the destination module. The only active output is $_x$_BBSY_B.

RDDK If valid data has been returned from the destination module, indicated by entering this state, the active outputs will be $_x$_BBSY_B and $_x$_DACK_B. It will then return to IDLE state.

DACK If an overwrite or message operation has completed successfully, this state will assert $_x$_DACK_B.

INVA This state indicates that no valid acknowledge has been received from a destination module during a bus operation. The outputs are $_x$_BBSY_B and $_x$_INVADR_B. $_x$_BBSY_B is asserted to protect the invalid address stored in the internal registers, as $16_{bi}$.

BERR This state indicates that an error has occurred during a bus operation, such as a timeout or a parity error. It could also enter this state because another module on the system bus has asserted a retry. The only active output is $_x$_ABORT_B.

TEST This state is used during board test. When in this state the outputs are $_x$_BBSY_B and $B_x$_DRIVE_B.

State Transitions of BIU-XMT (FIG. 5B)

IDLE to CMD: If the system bus grant signal $S_x$_BGNT$_x$_B becomes active while $_x$_BBSY_B and TIMEOUT_B are inactive, this indicates that the BIU-XMT state machine has been granted the system bus and can proceed to carry out a bus operation.

CMD to MSG1: If the TBOX 20 is the requestor to the BIU 10 and TIMEOUT_B is not active, the transmit state machine will proceed to send the first data word of the message onto the system bus, $12_a$, $12_b$.

MSGn to MSGn+1: If each of the four words of a TBOX message are sent correctly without any errors such as parity errors, timeouts, or retries, the transmit state machine will transition to the next state each clock. If $_x$_PENRDY_B becomes active during any of these states, it will stay in that state until xPENRDY_B becomes inactive, transitioning to the next message state, or an error or a retry occurs which causes a transition to BERR.

MSG4 to CHPS: If the fourth data word of a message has been sent correctly with no errors or retries, this transition will occur.

CHPS to CHPA: If no errors occurred during CHPS state, this transition will occur.

CHPS to BERR: If a bus error, retry, or timeout occurs, this transition will occur.

CHPA to DACK: If $_x$_PEACK_B becomes active while in this state, indicating that the destination module has correctly received the message, this transition will occur indicating to the CPM logic 8 that the message has been sent correctly.

CHPA to INVA: If $_x$_PEACK_B is not active during CHPA, indicating that the destination module did not correctly receive the message, this transition will occur indicating to the CPM logic 8 that the message had an invalid address error.

IDLE to TEST: If TS_XBDRV_B is active during a board test operation, this transition will occur.

CMD to WAIT: During a read operation, if a timeout has not occurred, this transition will be made. This is a transition to the data phase of a read operation. The state machine will stay in the WAIT state while either $_x$_MMNRDY_B or $_x$_PENRDY_B are active.

WAIT to BERR: If TIMEOUT_B becomes active, an error has occurred and this transition will be made.

WAIT to CHKA: During a read operation, if the destination module is ready and no timeout has occurred, this transition will be made.

CHKA to READ: If the destination module has acknowledged the bus operation by asserting either $_x$_PEACK_B or $_x$_MMACK_B, and a bus error or a retry do not occur, this transition will be made.

CHKA to INVA: This transition will be made if the destination module does not acknowledge the operation during this clock and a bus error or a retry do not occur.

CHKA to BERR: If a bus error or a retry occur during this clock, this transition will take place.

READ to RDDK: The state machine will idle in this state until $_x$_DATVLDFF_B becomes active or until a parity error or a timeout occurs. When valid data has been received, this transition will occur.

READ to BERR: If a parity error or a timeout occur while waiting for valid data, this transition will signal these events.

RDDK to IDLE: RDDK is a one clock state asserting $_x$_DACK_B to the rest of the CPM logic 8 indicating the read data has been received successfully.

CMD to DAT1: For an overwrite or a readlock operation, this is the transition to the data phase when there has been no timeout.

DAT1 to BERR: If a timeout occurs while waiting for $_x$_MMNRDY_B to become not active, this transition will take place.

DAT1 to WAIT2: During a readlock operation, when $_x$_MMNRDY_B becomes not active and no timeout occurs, this transition will take place.

DAT1 to CHKS: During an overwrite operation, when x_MMNRDY_B becomes not active and no timeout occurs, this transition will take place.

WAIT2 to CHKA: This is a one clock wait state during a readlock operation pausing until the next clock so acknowledgement can be checked. This transition will only occur if no bus error or retry signal becomes active.

WAIT2 to BERR: If a bus error or retry signal becomes active, this transition will take place.

CHKS to BERR: If a bus error or retry signal becomes active, this transition will take place.

CHKS to CHKO: If no bus error or retry signal becomes active, this transition will take place.

CHKO to DACK: This is a one clock check state to look for an $_x$_MMACK_B signal from memory on an overwrite command. If an acknowledge is made and no bus error's or retries are active, this transition will occur.

CHKS to INVA: If no acknowledge is received from memory, which indicates an invalid address, and no bus error or retry occurs, this transition will occur.

CHKS to BERR: If a bus error or retry signal becomes active, this transition will take place.

BUS INTERFACE UNIT—RECEIVE STATE MACHINE (BIU-RCV)

Figure 6A:
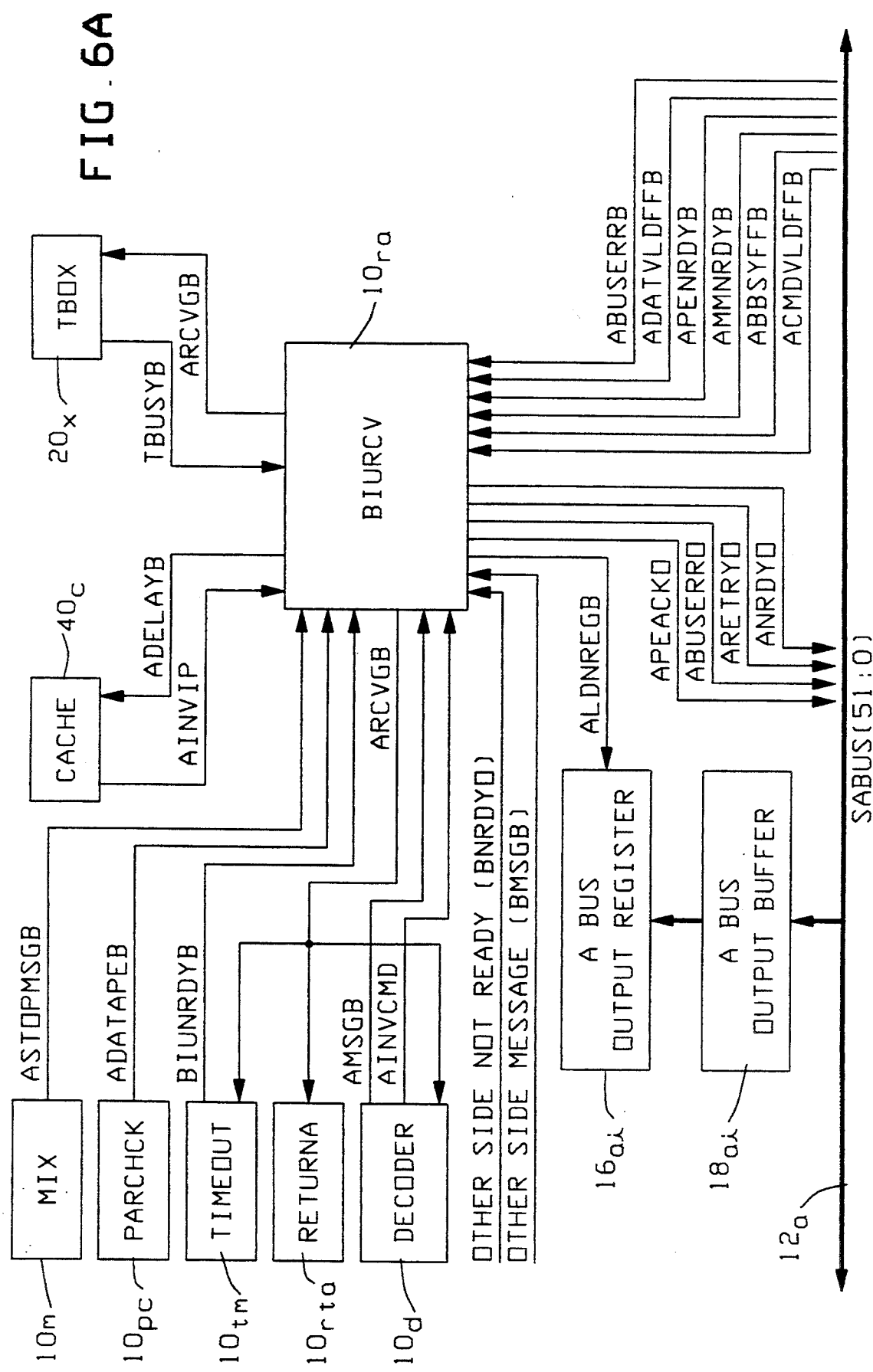
FIG. 6A is a block diagram showing the bus interface unit receive-programmable array logic whereby message data is moved from the system bus to the bus interface unit.

FIG. 6A shows a drawing of the bus interface unit programmable array logic state machine designated 10ra. The BIU-RCV programmable array logic is a state machine which is implemented, for example, by means of a Signetics PLUS405 type of device running at 16 megahertz. Its chief function is to control and handle messages coming in on one of the system busses (12$_a$, 12$_b$) which is addressed for a particular central processing module CPM.

The bus interface unit-receive state machine 10$_{ra}$ is the central programmable array logic unit of FIG. 6A which is shown having a set of signal line connections to certain elements of the system. It should be noted that the programmable array logic will assert to the system certain signals such as bus retries, bus errors and not-ready signals as appropriate. In the described system there is one bus interface receive state machine for each of the system busses 12$_a$ and 12$_b$.

As seen in FIG. 6A the bus interface unit-receive state machine will interchange signals with the system bus 12$_a$ and also with the A Bus internal register 16$_{ai}$ in addition to the cache unit 40$_c$ and the translator box logic unit 20$_x$. Other input lines to the bus interface unit-receive state machine are seen to be supplied by the Mix unit 10$_m$, the parity check unit 10$_{pc}$, the timeout unit 10$_{tm}$, the return unit 10$_{rta}$ and the decoder 10$_d$.

The BIU-RCV state machine is a dual bus receiving and routing system for receiving non-compatible protocol messages for storage in TBOX 20$_x$ and translation for message protocol compatibility to the Central Processing Module CPM 8. It controls and handles messages coming in on system busses 12$_a$, 12$_b$ which are addressed to a particular CPM and processor (if more than one CPM is used) or addressed to a translation logic unit 20 in the CPM 8.

The BIU-RCV will also assert the signal S$_x$_BERR_B if a parity error is detected; or it can assert S$_x$_RETRY_B if a message should be retried at a later time; or it can assert S$_x$_NRDY_B if a message needs to be held a few clocks before it can be accepted.

As seen in FIG. 6A, there are a series of inputs to the receive programmable array logic 10$_{ra}$.

INPUTS TO BIU-RCV (10$_{ra}$ FIG. 6A)

Processing Element Not Ready ($_x$_PENRDY_B)
 Source: S$_x$_PENRDY_B buffered by a Receiver Dest: BIU-XMT, TAG Check (LOADORG Control), BIU-RCV
Polarity: Active Low
Type: Unidirectional
If the BIU-RCV PAL detects a parity error on the system bus and is asserting $x$_Bus error_B, or the BIU-RCV is asserting $x$_RETRY_B, it will continue to assert these signals for two clocks after $x$_PENRDY_B has become inactive.

Incoming Message ($x$_MSG_B)
Source: DECODER PAL
Dest: BIU-RCV PAL and TBOX
Polarity: Active Low
Type: Unidirectional
This signal indicates to the BIU-RCV PAL that a message for the host CPM 8 has been detected on the system bus ($12_a$, $12_b$).

Stop Messages ($x$_STOPMSG_B)
Source: MIX PAL ($10m$)
Dest: BIU-RCV PAL
Polarity: Active Low
Type: Unidirectional
If a valid message is detected on the system bus and this signal is being asserted, the BIU-RCV PAL will assert $x$_RETRY_B.

Data Valid FF ($x$_DATVLDFF_B)
Source: Input Register
Dest: BIU-RCV PAL, TBOX, COMBINE PAL, RETURN PAL
Polarity: Active Low
Type: Unidirectional
This signal is active during the data phase of system bus operations. It is a registered input to the CPM card.

System Bus Error ($x$_Bus error_B)
Source: $S_x$_Bus error_B buffered by a Receiver
Dest: BIU-RCV PAL, Error Log Unit
Polarity: Active Low
Type: Unidirectional
This signal indicates that some active receiver on the system bus has detected a parity error.

Cache Full $x$_CACHEFULL_B)
Source: Cache
Dest: BIU-RCV PAL
Polarity: Active Low
Type: Unidirectional
The cache asserts this signal when its invalidation queue has filled or otherwise cannot proceed with invalidations. It causes the BIU-RCV PAL to assert a retry when a write operation initiated by a another processing element is detected on the system bus.

Data Parity Error $x$_DATAPE_B)
Source: PARCHCK PAL
Dest: BIU-RCV PAL, BIU-XMT PAL, Error Log Unit, DECODER PAL, RETURN PAL
Polarity: Active Low
Type: Unidirectional
This signal is asserted whenever a parity error is detected on one of the system buses.

TBOX Busy (T_BUSY_B)
Source: TBOX
Dest: BIU-RCV PAL
Polarity: Active Low
Type: Unidirectional
The TBOX asserts this signal whenever it is unable to process any new incoming messages from the system bus or is unable to service a request from the processor 28 IMP.

Memory Module Not Ready ($x$_MMNRDY_B)
Source: $S_x$_MMNRDY_B buffered by a Receiver
Dest: BIU-RCV PAL, BIU-XMT PAL
Polarity: Active Low
Type: Unidirectional
If the BIU-RCV detects a parity error on the system bus and is asserting $x$_Bus error_B, or the BIU-RCV PAL is asserting $x$_RETRY_B, it will continue to assert these signals for two clocks after $x$_MMNRDY_B has become inactive.

System Bus Busy FF ($x$_BBSYFF_B)
Source: Input Register
Dest: BIU-RCV PAL
Polarity: Active Low
Type: Unidirectional
This signal indicates that a bus requestor has control of the system bus.

Invalidation Command ($x$_INVCMD)
Source: DECODER PAL
Dest: BIU-RCV PAL, CACHE
Polarity: Active High
Type: Unidirectional
Indicates that a bus operation, such as an overwrite, that requires cache invalidation, has occurred on the system bus.

Bus Busy ($x$_BBSY_B)
Source: XMIT PAL
Dest: BIU-RCV PAL, System Bus, DECODER PAL
Polarity: Active Low
Type: Unidirectional
This signal indicates that the BIU-XMT PAL is currently executing a bus operation.

Command Valid FF ($x$_CMDVLDFF_B)
Source: Input Register
Dest: BIU-RCV PAL, DECODER PAL, Cache
Polarity: Active Low
Type: Unidirectional
Indicates that a command from the system bus is valid within the input register, $18_{ai}$, $18_{bi}$.

Other Side Not Ready ($x$_NRDYO)
Source: Other Side BIU-RCV PAL
Dest: BIU-RCV PAL, System Bus
Polarity: Active High
Type: Unidirectional
This signal from the opposite BIU-RCV PAL indicates that it is asserting "not ready" on its system bus. This is used to detect and escape a possible dead lock condition.

BIU Not Ready (BIU_NRDY_B)
Source: TIMEOUT PAL
Dest: BIU-RCV PAL
Polarity: Active Low
Type: Unidirectional
Indicates to the BIU-RCV PAL that if any messages come onto the system bus addressed to the host CPM 8, _PENRDY_B should be asserted until this signal is inactive.

The bus interface unit receive state machine also has a number of output lines which are listed below together with their functions:

OUTPUTS: BIU-RCV, FIG. 6A

Invalidation Command Delay ($x$_DELAY_B)
Dest: Cache Invalidation Logic
Polarity: Active Low Type: Unidirectional This signal is the $_x$_INVCMD signal delayed for one clock.

Processing Element Acknowledge ($_x$_PEACKO_B)
  Dest: System Bus Driver, Test Register
  Polarity: Active Low
  Type: Unidirectional, Open Collector on System Bus
  Once an entire message has been received by the CPM 8, this signal is asserted on to the system bus to the message originator, to indicate the message has been correctly received.

Load Internal Register ($_x$_LDNREGI_B)
  Dest: COMBINE PAL
  Polarity: Active Low
  Type: Unidirectional
  As a message is being sent to the host CPM, this signal loads the internal register as valid data is being received in the input register.

Bus Error ($_x$_Berro)
  Dest: System Bus Driver
  Polarity: Active High
  Type: Unidirectional
  Indicates that a bus error has been detected on the system bus during any command phase or any data phase in which the host CPM 8 is involved.

Receiving Message ($_x$_RCVG_B)
  Dest: DECODER PAL, TIMEOUT PAL, TBOX LCA, TBXCNTR PAL, RETURN PAL
  Polarity: Active Low
  Type: Unidirectional
  Indicates that a message is currently being received off of the system bus.

System Bus Retry ($_x$_RETRYO)
  Dest: System Bus Driver
  Polarity: Active High
  Type: Unidirectional
  Tells the originator of the system bus operation to retry the operation at a later time. This signal will be asserted for messages if the TBOX 20 is busy doing another operation or if simultaneous messages are received on both buses. It will also be asserted for write type system bus operations if the cache is currently unable to service the invalidation.

System Bus Not Ready (x_NRDYO)
  Dest: System Bus Driver, Other Side BIU-RCV PAL
  Polarity: Active High
  Type: Unidirectional
  This signal is asserted as S$_x$_PENRDY_B on the system bus after traveling through an inverting open collector buffer. It is asserted when a message is loaded into the input register while BIU_NRDY_B is active.

There are several internal flip-flops used in the bus interface unit receive state machine. These are indicated as follows:

BIU-RCV Internal Flip-Flop's

CFULLBFF This flip-flop is used to synchronize the 12 Mhz signal $_x$_CACHEFULL_B to 16 Mhz.

NRDYBFF This flip-flop internally extends the "not ready" signals $_x$_MMNRDY_B and $_x$_PENRDY_B so the signal $_x$_Bus error O will remain valid for two clocks after the "not ready" signals are no longer active. It is set when either signal is active and reset once both are inactive.

DELAYB This flip-flop is used to delay the signal $_x$_INVCMD one clock before it is sent to the cache invalidation logic.

Figure 6B:
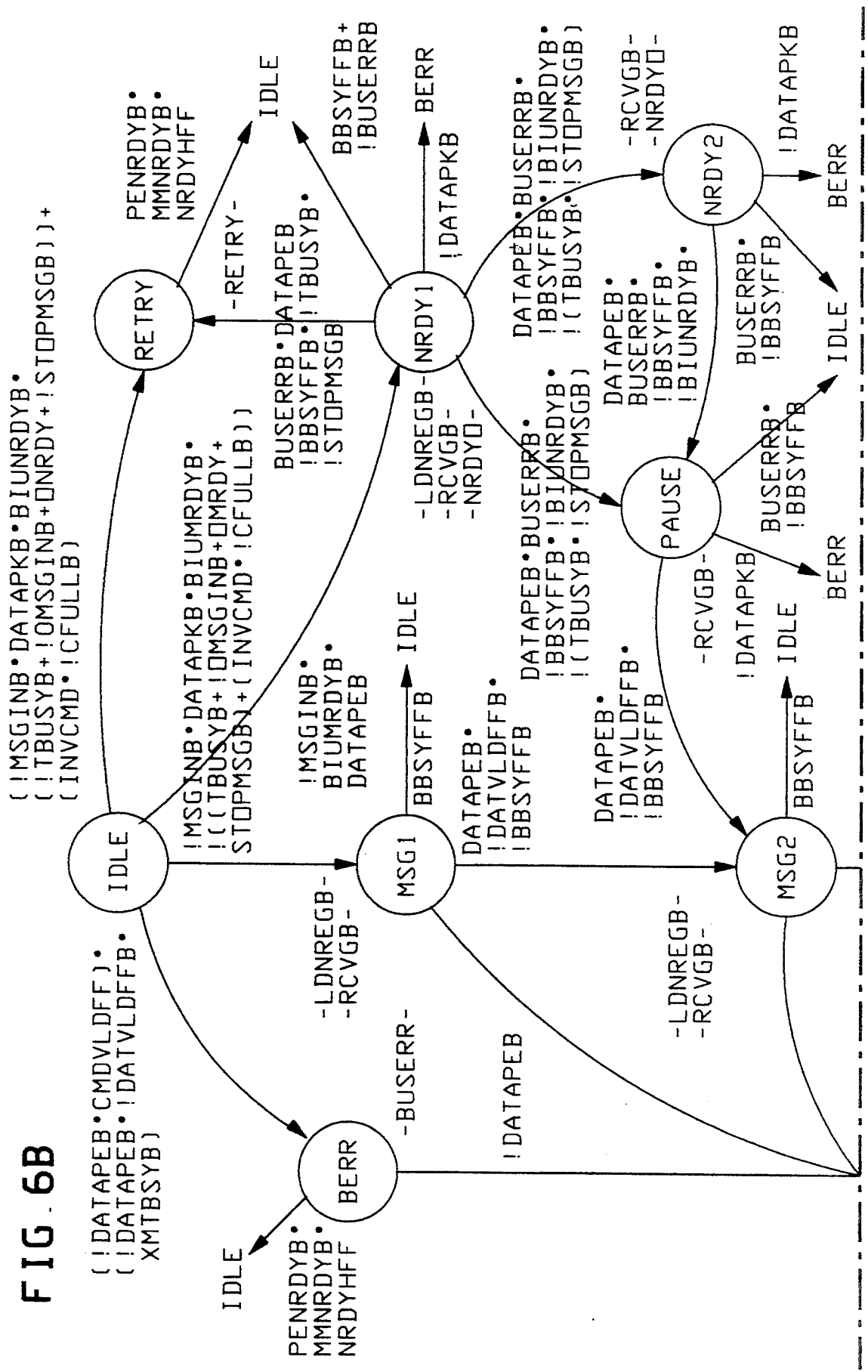

The state machine functions provided by the bus interface unit-receive state machine involve some eleven automatic functions which are shown in FIG. 6B.

The following list indicates the operations provided by the various functions of the bus interface unit- receive state machine:

IDLE When the reset signal (405_RESETx) is applied to the BIU-RCV PAL, the internal state machine will go to the IDLE state (FIG. 6B). It will also return to this state after an operation is completed. While in this state, all output signals are inactive.

MSGn In this state the active outputs are $_x$_LDNREG-1_B which loads message words into the internal register 16$_{ai}$ from the indicated system bus, and $_x$_RCVG_B, which indicates that a valid message is currently being loaded from the system bus.

BERR This state asserts the output $_x$_Berro. The current system bus requestor will see that a parity error has been detected and will take appropriate action.

RETRY This state asserts the output $_x$_RETRYO. This will cause the current system bus requestor to discontinue the operation and retry at a later time.

NRDY1 The current system bus requestor will wait in the data phase of the message while $_x$_NRDYO is active in this state. The signals $_x$_LDNREG1_B and xRCVG_B will also be asserted.

NRDY2 This state is the same as NRDY1 except that $_x$_LDNREG1_B is not active because the first message word has already been loaded into the internal register, 16$_{ai}$.

PAUSE $_x$_RCVG_B is asserted in this state while waiting for the message to resume being sent.

PEACK When an entire valid message has been loaded from the system bus, this state will assert $_x$_PEACKO_B. This indicates to the message originator that the message has been received correctly.

STATE TRANSITIONS: BIU-RCV, FIG. 6B

IDLE to BERR: This transition will occur when a parity error has been detected on the system bus during the command phase of any bus operation and during the data phase of any operation in which the host CPM 8 is involved.

IDLE to RETRY: If a valid message for the host CPM 8 is detected on the system bus and the CPM is not able to accept it due to the TBOX 20 being busy, or the cache spy register 40$_c$ being full with the cache unable to invalidate a system bus write type operation, this transition will occur. It will also occur in the system bus B BIU-RCV PAL if a message is simultaneously detected on both the A and B system buses at the same time.

IDLE to NRDY1: If a valid message for the host CPM 8 is detected while the TIMEOUT PAL is asserting BIU_NRDY_B, this transition will occur. This indicates that the BIU 10 is currently unable to accept the message but will soon be able to.

IDLE to MSG1: This transition will occur when an incoming message is detected and it would not otherwise go to the berr, retry, or nrdy1 states. This transition will occur if $_x$_MSG_B is active while none of the following are active: xDATAPE_B, BIU_NRDY_B, T_BUSY_B, $_x$_STOPMSG_B, other side NRDYO, and for the B bus BIU-RCV PAL, A_MSG_B.

BERR TO IDLE: The state machine will stay in the BERR state until two clocks after the not ready signals $_x$_PENRDY_B and $_x$_MMNRDY_B are no longer active. This is done by having the not ready signals set the internal flip-flop NRDYBFF and by transitioning, once all three signals are inactive.

RETRY to IDLE: The receive state machine will stay in the RETRY state until two clocks after the "not ready" signals $_x$_PENRDY_B and $_x$_MMNRDY_B are no longer active. This is done by having the "not ready" signals set the internal flip-flop NRDYBFF and by transitioning, once all three signals are inactive.

MSGn to BERR: If a parity error is detected on the system bus while a message is being loaded during any of these states, this transition will occur.

MSGn to IDLE: If the signal $_x$_BBSYFF_Bgoes inactive while in any of these states, the message originator did not complete sending a valid message and the state machine will go back to idle.

PEACK to IDLE: This is an immediate transition once the PEACK state has been entered. The message has been correctly received and the BIU-RCV state machine is going back to idle.

NRDY1 to IDLE: If the signal $_x$_Berr_B is detected on the system bus, an error has occurred while $_x$_PENRDY_B is being asserted. The message originator will withdraw from the system bus and the state machine will go back to idle. If $_x$_BBSYFF_B is no longer asserted, this indicates the message originator has disconnected from the system bus and will not complete sending the message.

NRDY1 to RETRY: This transition is used to escape from the "deadlock case" where the CPM 8 has sent a message out on one bus, which has received an $S_x$_PENRDY_B from the destination module, while it is receiving a message on the other bus for which it is asserting its own $S_x$_PENRDY_B. The signal $_x$_STOPMSG_B has the signal TBXMSG_OUT or'ed into it which indicates that the host CPM 8 is sending out a message. If the signals $_x$_STOPMSG_B and T_BUSY_B are active, and the BIU-RCV PAL is in the NRDY1 state, it knows that a deadlock condition has occurred. To escape from this, the BIU-RCV asserts a $_x$_RETRYO to the message sending module, which will release the two modules from the deadlock.

NRDY1 to BERR: If the signal $_x$_DATAPE_B is active during the NRDY1 state indicating a parity error on the bus, the BIU-RCV PAL will assert $_x$_Bus error O.

NRDY1 to NRDY2: If the signal BIU_NRDY_B continues to be asserted, no deadlock condition is detected, and there are no parity errors detected, this transition will occur. This transition is necessary so the signal $_x$_LDNREG1_B is not continuously active while $_x$_NRDYO is being asserted.

NRDY1 to PAUSE: This transition is made if the signal BIU_NRDY_B is no longer active while in the NRDY1 state. If no deadlock condition is detected and there are no parity errors detected, this transition will occur. This state is necessary to wait for the module sending the message to see that $S_x$_PENRDY_B is no longer being asserted and it can now continue sending the message.

NRDY2 to BERR: If a parity error is detected during this state, the BIU-RCV PAL must assert $_x$_Berro and the message will no longer be accepted.

NRDY2 to IDLE: If the signal _Buserr_B is detected from the system bus, an error has occurred while PENRDY_B is being asserted. The message originator will withdraw from the system bus and the state machine will go back to idle. If $_x$_BBSYFF_B is no longer asserted, this indicates the message originator has disconnected from the system bus and will not complete sending the message.

PAUSE to IDLE: If the signal $_x$_Buserr_B is detected from the system bus, a system bus module has detected a parity error. The message originator will withdraw from the system bus and the state machine will go back to idle. If xBBSYFF_B is no longer asserted, this indicates the message originator has disconnected from the system bus and will not complete sending the message.

PAUSE to BERR: If a parity error is detected during this state, the BIU-RCV PAL must assert $_x$_Buserro and the message will no longer be accepted.

PAUSE to MSG2: If there is no parity error and the message originator is still asserting $_x$_BBSYFF_B, then the rest of the message can now be accepted normally.

Figure 7A:
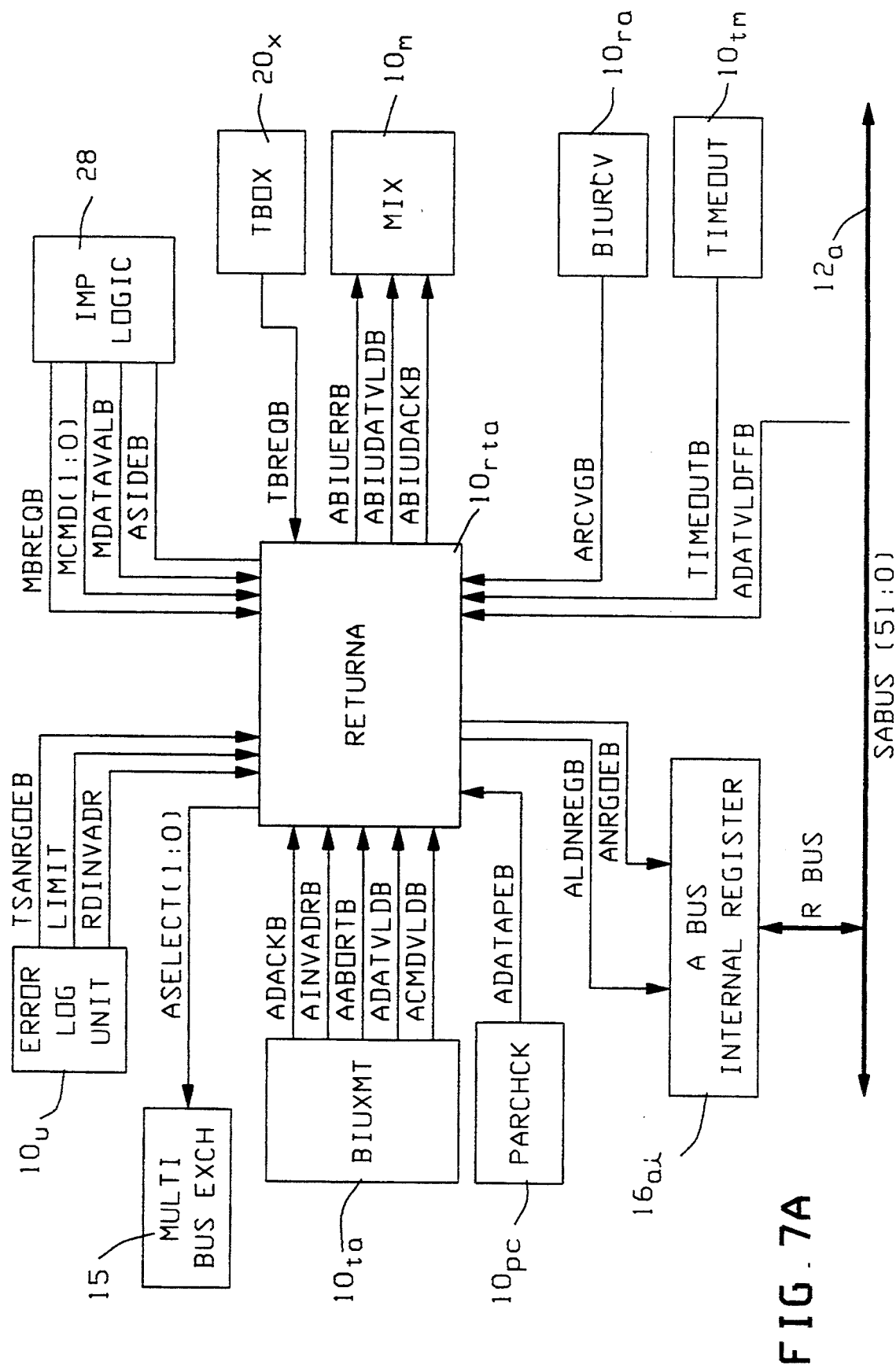
FIG. 7A is a block diagram of the return-programmable array logic for the bus interface unit.
Figure 7C:
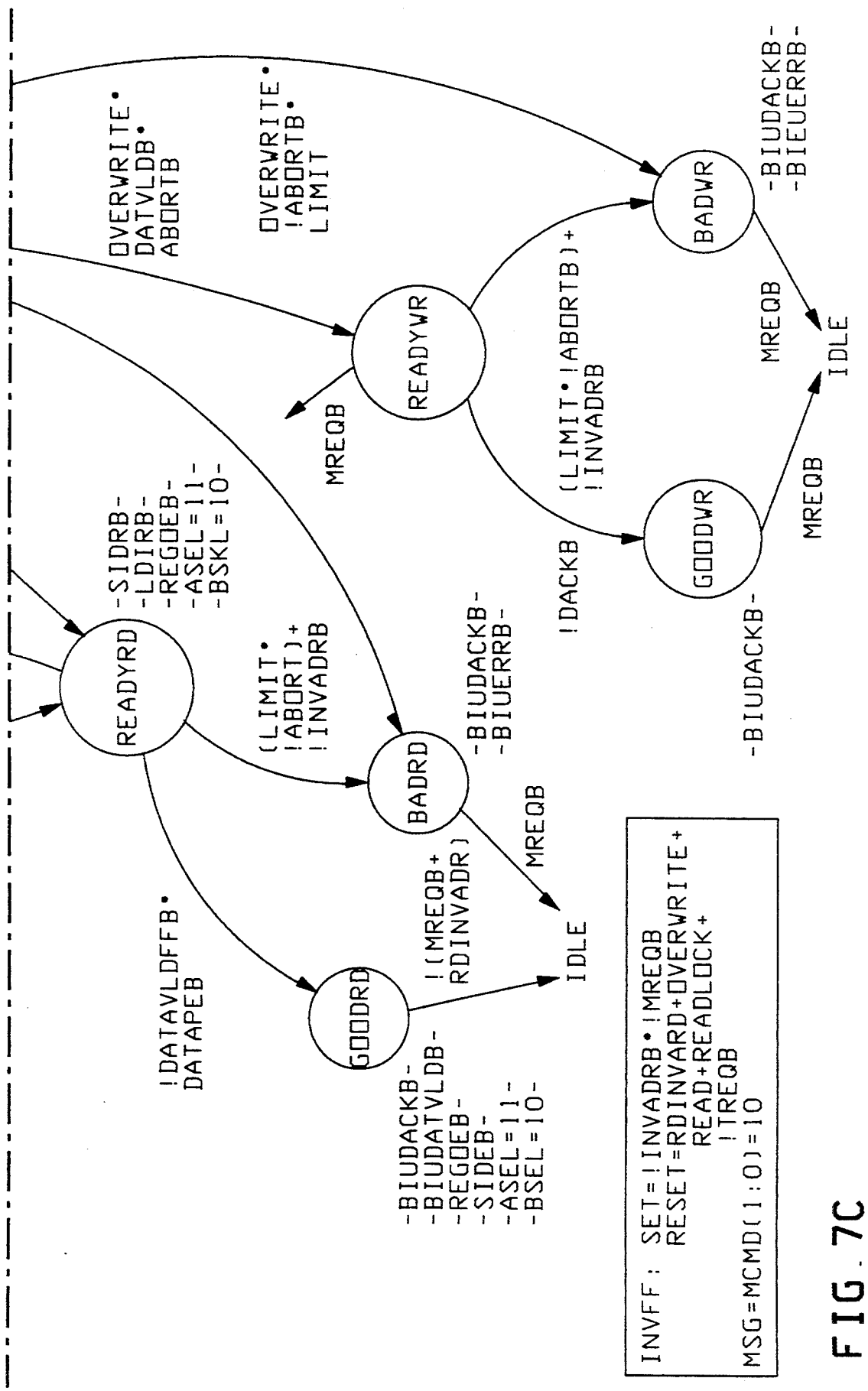

FIG. 7A is a block diagram showing the signals which relate to the RETURN A state machine $10rta$. This state machine has the function to control the select lines of the multiple bus exchange 15 and to signal the mainframe processor logic 28 when "read" data is being returned to it or when an operation has been completed. It will also signal if there was an error that prevented the operation from being completed successfully.

In actuality, there are two separate RETURN programmable array logic units designated as RETURN A ($10_{rta}$) and RETURN B ($10_{rtb}$). The only difference between the two programmable array logic units is the encoding on the select lines to the multiple bus exchange 15 of the two busses. The acronym RETURN$_x$ will refer to the features of both of these programmable array logic units. The Return PAL is a state machine implemented with a Signetics PLUS 405 device operating at 16 MHZ.

Referring to FIG. 7A the RETURN programmable array logic $10_{rta}$ will be seen to receive signals from the parity check unit $10_{pc}$, from the bus interface transmit unit $10_{ta}$, from the error log bus interface $10_u$, from the mainframe processor logic 28, from the translator box unit $20_x$, and from the bus interface receive unit $10_{ra}$ and the timeout unit $10_{tm}$. Additionally, there is an input line from the system bus such as $12_a$ to the return logic $10_{rta}$.

The RETURN programmable array logic $10_{rta}$ will be seen to provide output signals to the multi-bus exchange 15, to the processor logic 28, to the MIX unit $10_m$ and to the A Bus internal register $18_{ai}$.

Basically the Return-PAL provides a dual bus signal control operation for a processor. It allows "read data" from a dual system bus to be sent to the mainframe processor 28 and signals whether the read command was completed successfully or unsuccessfully. It detects and decides whether the operation should be re-tried or not and tells the mainframe processor the final result status. This is accomplished for each bus of the dual system busses.

The following is a list of input signals and their functions which are passed on to the RETURN programmable array logic $10_{rta}$.

INPUTS TO RETURN PAL, FIG. 7A

Data Acknowledge (_DACK_B)
  Source: BIU-XMT PAL
  Dest: RETURN$_x$ PAL
  Polarity: Active Low
  Type: Unidirectional
  This signal becomes active when a system bus operation has completed successfully.

Invalid Address ($_x$_INVADR_B)
  Source: BIU-XMT PAL
  Dest: RETURN$_x$ PAL, Error Log Unit
  Polarity: Active Low
  Type: Unidirectional
  This signal indicates that the bus operation in progress had an invalid address error. This means that the destination module did not provide an acknowledge when a operation was directed towards it.

Operation Abort ($_x$_ABORT_B)
  Source: BIU-XMT PAL
  Dest: RETURN$_x$ PAL, Error Log Unit
  Polarity: Active Low
  Type: Unidirectional
  If this signal becomes active, it indicates that the bus operation in progress had to be aborted. This could be because of a parity error on the system bus, a timeout, or a module asserting retry during an operation.

Data Valid ($_x$_DATVLD_B)
  Source: BIU-XMT PAL
  Dest: RETURN$_x$ PAL, System Bus via Output Driver
  Polarity: Active Low
  Type: Unidirectional
  This signal indicates the "data phase" during the current bus operation.

Command Valid _CMDVLD_B)
  Source: BIU-XMT PAL
  Dest: RETURN$_x$ PAL, Error Log Unit, System Bus via Output Driver
  Polarity: Active Low
  Type: Unidirectional
  This signal indicates the command phase during the current bus operation.

IMP Command (M_CMD016, M_CMD116)
  Source: CMDREQ PAL synchronized in Error Log Unit
  Dest: RETURN$_x$ PAL, BIU-XMT PAL, TIMEOUT PAL
  Polarity: Encoded Bus
  Type: Unidirectional, Encoded Commands
  These two signals contain the bus operation encoding from the mainframe processor (IMP) interface logic. See Table I . for their values.

PROCR (IMP) BIU Request (M_BREQ16_B)
  Source: CMDREQ PAL synchronized in Error Log Unit
  Dest: RETURN$_x$ PAL, BIU-XMT PAL, TIMEOUT PAL
  Polarity: Active Low
  Type: Unidirectional
  This signal validates the mainframe processor IMP Command bits.

Read Invalid Address (RDINVADR16)
  Source: CMDREQ PAL synchronized in Error Log Unit
  Dest: RETURN$_x$ PAL, TIMEOUT PAL
  Polarity: Active High
  Type: Unidirectional
  This signal indicates that the mainframe processor (IMP) has received an invalid address error and is now reading the address out of the internal registers, $18_{ai}$, $18_{bi}$.

Retry Limit (LIMIT)
  Source: Error Log Unit
  Dest: RETURN$_x$ PAL, DECODER PAL
  Polarity: Active High
  Type: Unidirectional
  If this signal is active, the next attempt to use the system bus that receives a retry or a bus error will have exceeded the retry limit.

TBOX BIU Request (T_BREQ_B)
  Source: TBOX
  Dest: RETURN$_x$ PAL, TIMEOUT PAL, BIU-XMT PALS, TAGCHCK PAL
  Polarity: Active Low
  Type: Unidirectional
  This signal indicates to the BIU 10 that the TBOX 20 would like to start sending a message onto a system bus.

Operation Timeout (TIMEOUT_B)
  Source: TIMEOUT PAL
  Dest: BIU-XMT PAL, Error Log Unit, RETURN PAL
  Polarity: Active Low
  Type: Unidirectional
  If this signal becomes active, it indicates that the present operation has timed out waiting for a system bus grant or waiting for data to be returned during a read type operation.

Data Valid Flip-Flop $_x$_DATVLDFF_B)
  Source: Input Register
  Dest: RETURN$_x$ PAL, BIU-RCV PAL, TBOX, COMBINE PAL
  Polarity: Active Low
  Type: Unidirectional
  This signal is active during the data phase of system bus operations. It is a registered input to the CPM 8 card.

Receiving Message ($_x$_RCVG_B)
  Source: BIU-RCV PAL
  Dest: RETURN$_x$ PAL, TIMEOUT PAL, DECODER PAL, TBOX, TBXCNTR PAL
  Polarity: Active Low
  Type: Unidirectional
  This signal will be active whenever the BIU-RCV PAL is in the process of receiving a message from the system bus.

Data Parity Error ($_x$_DATAPE_B)
  Source: PARCHCK PAL
  Dest: RETURN$_x$ PAL, BIU-XMT PAL, Error Log Unit, DECODER PAL
  Polarity: Active Low
  Type: Unidirectional
  This signal is asserted whenever a parity error is detected on one of the system buses.

Test Register Output Enable (TS_$_x$NRGOE_B)
  Source: Error Log Unit
  Dest: RETURN$_x$ PAL
  Polarity: Active Low
  Type: Unidirectional
  This test signal causes the internal registers $18_{ai}$, $18_{bi}$ to drive their data and the multiple bus exchange 15 to source the A or B bus.

The RETURN programmable array logic unit-state machine, 10$_{rta}$ of FIG. 7A, has a number of output lines which are listed hereinbelow in addition to Table II which indicates the RETURN select lines:

OUTPUTS: RETURN$_x$ PAL FIG. 7A

Multiple Bus Exchange Select Lines ($_x$—SELECT—0,$_x$—SELECT—1)
Dest: Multiple Bus Exchange via driver
Polarity: Encoded Bus
Type: Unidirectional, Encoded Commands
These two select lines determine in which way the multiple bus exchange 15 routes the various buses. Table II . lists the encoded values for the A and B bus select lines.

TABLE II

| A SELECT(1:0)A | Port Status |
|---|---|
| 00 | M—BUS drives A—BUS |
| 01 | T—BUS drives A—BUS |
| 10 | B—BUS drives A—BUS |
| 11 | Source |

| B SELECT(1:0)B | Port Status |
|---|---|
| 00 | M—BUS drives B—BUS |
| 01 | T—BUS drives B—BUS |
| 10 | Source |
| 11 | A—BUS drives B—BUS |

Load Internal Register ($_x$—LDNREG3—B)
Dest: COMBINE PAL
Polarity: Active Low
Type: Unidirectional
This signal being active causes the internal registers (18$_{ai}$, 18$_{bi}$) to load data on the RxBUS.

BIU Error ($_x$—BIUERR—B)
Dest: MIX PAL
Polarity: Active Low
Type: Unidirectional
When this signal is returned from the BIU logic it indicates that an operation finished with an error such as a parity error, a retry limit, or an invalid address.

Side Active ($_x$—SIDE—B)
Dest: COMBINE PAL, DIRECT PAL
Polarity: Active Low
Type: Unidirectional
This signal indicates which system bus an operation went out on. It is used to let the mainframe processor (IMP) logic know which bus to access when read data is returned.

Internal Register Output Enable ($_x$—NRGOE—B)
Dest: Internal Register
Polarity: Active Low
Type: Unidirectional
This signal causes the internal register (18$_{ai}$, 18$_{bi}$) to drive its contents onto the A or B bus.

BIU Data Valid ($_x$—BIU—DATVLD—B)
Dest: MIX PAL
Polarity: Active Low
Type: Unidirectional
This signal indicates to the processor (IMP) logic that valid read data is being driven to the M—BUS, 28$_m$.

BIU Data Acknowledge ($_x$—BIU—DACK—B)
Dest: MIX PAL
Polarity: Active Low
Type: Unidirectional
When a bus operation has completed, this signal will be driven to the IMP Logic.

RETURN$_x$: Internal Flip-Flop's

INVFF This internal flip-flop is set when an invalid address occurs on the system bus for which each particular RETURN PAL is associated. It is used so the appropriate sides internal register (18$_{ai}$, 18$_{bi}$) is driven when the read invalid address command is issued. It is reset when the read invalid address command is issued or if any other bus command is issued by the processor 28 (IMP).

WAIT This internal flip-flop is used to assure that the invff does not reset during the same processor (IMP) operation it is set.

FIG. 7B shows the various functions provided by the RETURN PAL state machine which is resident in the hardware of FIG. 7A. As seen in FIG. 7B, there are 14 functional operational states associated with the RETURN state machine 10$_{rta}$ or 10$_{rtb}$.

The various states provided by the RETURN state machine and also the state transitions are indicated hereinbelow together with the functions that they perform.

STATES FOR RETURN-PAL

IDLE When the reset signal (405—RESETx) is applied to the RETURN$_x$ PAL, the state machine will go to the IDLE state FIG. 7B. While in this state, all output signals are inactive.

TBOX This state is entered when the TBOX 20 is attempting to send a message out onto the system bus. Its purpose is to change the multiple bus exchange select lines to have the A and B bus accessing the T—BUS, 20$_t$.

TBOX2 Once a message operation has been sent onto a system bus, this state becomes active. It continues to drive the multiple bus exchange select lines so the T—BUS drives the A or B bus. This state is waiting to determine whether the message is sent correctly or if an error occurs.

GOODTBX This state means that the TBOX message was sent out with no errors. $_x$—BIU—DACK—B is sent to the processor 28 (IMP) logic to indicate this. It waits in this state until the IMP processor logic acknowledges this information by turning off the its message request, which is M—CMD(1:0)16=10B.

BADTBX This state means that an error occurred while trying to send out the TBOX message. This error could be an invalid address error or the retry limit being reached. It drives $_x$—BIU—DACK—B and $_x$—BIUERR—B to the IMP processor logic to indicate this. It waits in this state until the IMP processor logic acknowledges this information by turning off its message request, which is M—CMD(1:0)16=10B.

READYRD The state machine waits in this state for read data to be returned from the system bus. It is constantly loading the internal registers with $_x$—LDNREG3—B and has the multiple bus exchange select lines set to drive the appropriate A or B bus to the M—BUS. $_x$—SIDE—B is active to tell the IMP processor logic which bus to expect read data from. The internal register output enable with $_x$—NRGOE—B is also active so the A or B bus is driven rather than tri-stated.

GOODRD This state means that a read type operation completed successfully and is driving data back to the IMP processor 28. The $_x$—BIU—DACK—B and $_x$—BIU—DATVLD—B signals are active to indicate to the IMP processor that data is being driven to it. The multiple bus exchange lines are set to drive the appropriate A or B bus to the M—BUS. $_x$—SIDE—B is active to tell the IMP processor logic which bus to expect read data from. The internal register output enable $_x$_NRGOE_B is also active to drive the data toward the IMP processor 28.

WAIT This state is entered when doing a readlock or overwrite operation after the command phase. It is only waiting until the data phase before its next transition. There are no active outputs.

READYWR This state waits for the finish of an overwrite operation. There are no active outputs.

GOODWR If this state is entered it indicates that the overwrite operation finished correctly. It drives $_x$_BIU_DACK_B to the IMP processor logic to indicate this. Once the signal M_BREQ16_B becomes inactive to indicate the IMP processor logic acknowledged this information, it will transition back to the idle state.

BADWR If this state is entered it indicates that the overwrite operation finished with an error, either an invalid address or a retry limit. It will indicate this information to the IMP processor 28 by driving $_x$_BIU_DACK_B and $_x$_BIUERR_B. Once the signal M_BREQ16_B becomes inactive to indicate the IMP processor logic acknowledged this information, it will transition back to the idle state.

RCVNG This state becomes active when a message is being received from a system bus. Its purpose is to change the multiple bus exchange control lines so either the A or B bus is driving the T_BUS (20$_t$) depending on which bus the message is being received from. It also drives $_x$_NRGOE_B active to cause the internal registers to drive their message data.

STATE TRANSITIONS IN RETURN PAL, FIG. 7B

IDLE to TBOX: When the TBOX 20 makes a request with T_BREQ_B to use the BIU 10 to send a message, this transition is made.

TBOX to IDLE: If while waiting for $_x$_CMDVLD_B to go active T_BREQ_B should go inactive, this transition will be made. The request signal could go away because the TBOX is retrying the operation at a later time due to timing out OR waiting to be granted a system bus.

TBOX to TBOX2: When $_x$_CMDVLD_B becomes active and T_BREQ_B is still active, this transition is made.

TBOX to BADTBX: If the operation times out with TIMEOUT_B and LIMIT both being active, this transition will be made. This indicates that a retry limit has been reached, the operation will not be retried, and an error will be signaled back to the (IMP) processor logic.

TBOX2 to IDLE: If T_BREQ_B should go inactive during this state, it would indicate that an error occurred while sending out the message and it is being retried later. The state machine will therefore go back to the idle state.

TBOX2 to BADTBX: This transition will be made if there is an error which must be reported back to the (IMP) processor logic. It can occur if there was an invalid address error, $_x$_INVADR_B, or if the $_x$_ABORT_B signal was active indicating a parity error or timeout and the LIMIT signal is active signifying the retry limit has been reached.

TBOX2 to GOODTBX: This transition is made when the message has been sent successfully. The transition is caused by $_x$_DACK_B going active.

BADTBX, GOODTBX to IDLE: Once the message command on the M_CMD(1:0)16 signals has gone away, this will indicate that the processor (IMP) has acknowledged the end of the operation. These transitions will then be made.

IDLE to GOODRD: This transition is made during a rdinvadr operation. If the internal flip-flop invff is set, this indicates that the previous operation on the system bus (related to the particular RETURN$_x$ PAL) got an invalid address error. The PAL therefore needs to drive the address from the internal register to the processor 28 (IMP) in the goodrd state.

IDLE to READYRD: During a read operation, when $_x$_CMDVLD_B becomes active, this transition is made.

READYRD to IDLE: If the M_BREQ16_B signal goes inactive, this indicates that the IMP processor logic is retrying the operation at a later time and the state machine should go back to idle waiting for the operation to begin again.

READYRD to GOODRD: This transition indicates that a read operation has completed successfully. If $_x$_DATVLDFF_B is active while $_x$_DATAPE_B is inactive, the transition is made.

READYRD to BADRD: This transition is made when a read operation is completed with an invalid address error, $_x$_INVADR_B, or $_x$_ABORT_B and LIMIT, indicating a retry limit error.

IDLE to BADRD: During any operation from the processor (IMP) logic 28, indicated by M_BREQ16_B, if TIMEOUT_B and LIMIT are both active, this indicates a retry limit has been reached and the error should be reported back to the IMP processor logic.

IDLE to WAIT: During a readlock or overwrite operation, when $_x$_CMDVLD_B becomes active, this transition is made.

WAIT to IDLE: If the M_BREQ16_B signal goes inactive, this indicates that the (IMP) processor logic is retrying the operation at a later time and the state machine should go back to idle waiting for the operation to begin again.

WAIT to PAUSE: Once the data phase of a readlock or overwrite operation is reached with $_x$_DATVLD_B becoming active, this transition is made.

PAUSE to IDLE: If the M_BREQ16_B signal goes inactive, this indicates that the (IMP) processor logic is retrying the operation at a later time and the state machine should go back to idle waiting for the operation to begin again.

PAUSE to READYRD: This transition is made for a readlock operation while the return state machine is waiting for read data from memory. It is made once data is no longer being sent on the system bus, indicated by $_x$_DATVLD_B no longer being active, and the operation is not aborted with $_x$_ABORT_B.

PAUSE to BADRD: This transition is made when the retry limit is reached during a readlock operation with both LIMIT and $_x$_ABORT_B being active.

PAUSE to READYWR: This transition is made for an overwrite operation once data is no longer being sent on the system bus, indicated by $_x$_DATVLD_B no longer being active, and the operation is not aborted with $_x$_ABORT_B.

PAUSE to BADWR: This transition is made when the retry limit is reached during an overwrite operation with both LIMIT and $_x$_ABORT_B being active.

READYWR to GOODWR: This transition is made when an overwrite operation has been completed successfully. The transition is caused by $_x$—DACK—B going active.

READYWR to BADWR: This transition is made when the retry limit is reached during an overwrite operation with both LIMIT and$_x$—ABORT—B being active, or when $_x$—INVADR—B is active.

GOODWR, BADWR to IDLE: If the M—BREQ16—B signal goes inactive, this indicates the (IMP) processor logic acknowledges the end of the operation. The return state machine will go back to idle and wait for the next operation.

TIMEOUT STATE MACHINE

The timeout state machine is a programmable array logic unit which is state machine implemented, usually by means of a Signetics PLUS405 device, which runs at 16 Megahertz. The chief function of the timeout state machine is to send out a request for use of the system bus (12a, 12b) and also to determine if an operation has already timed out.

Figure 8A:
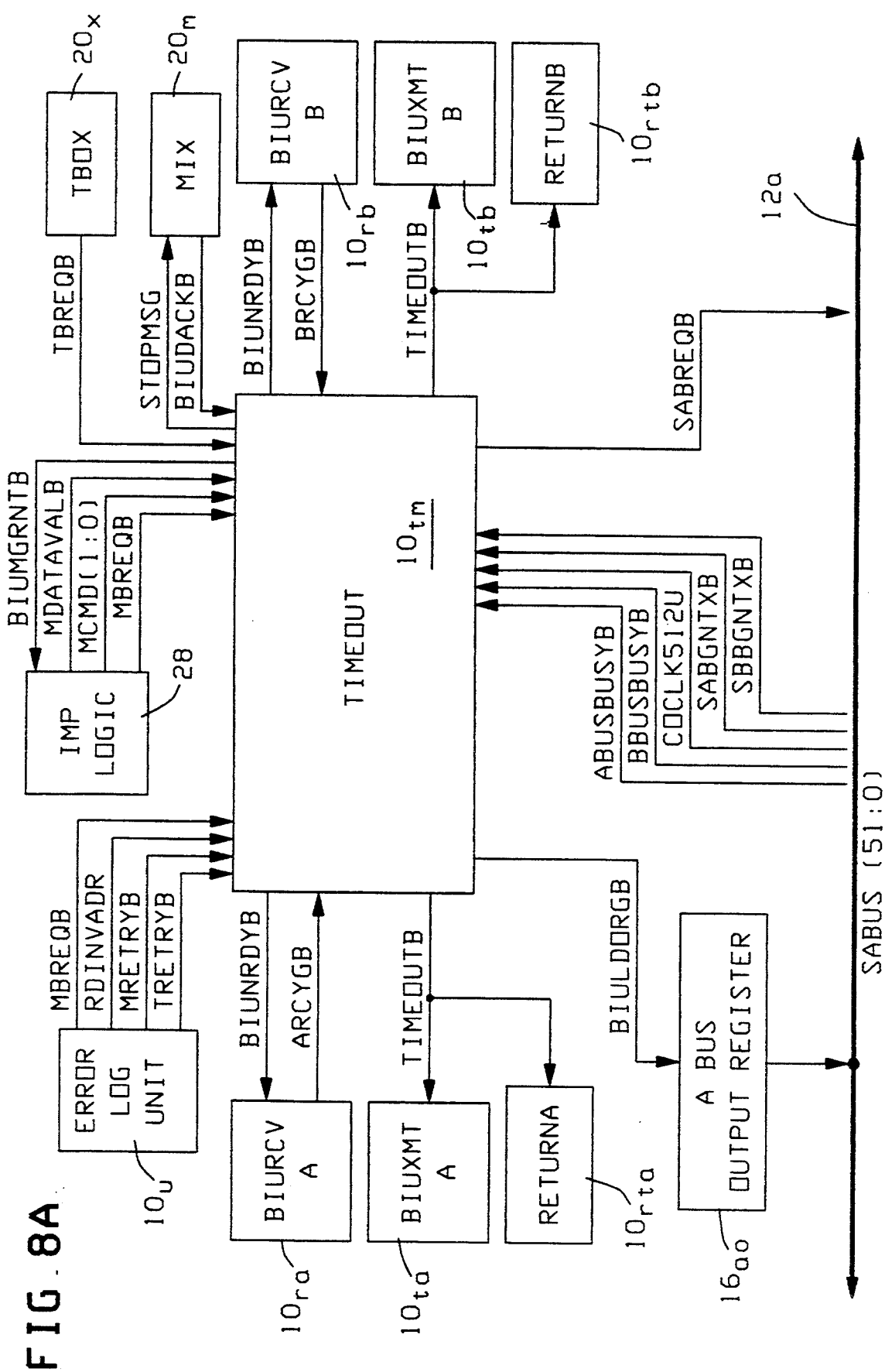
FIG. 8A is a block diagram to illustrate the functioning of the programmable timing logic of the bus interface unit.
Figure 8C:
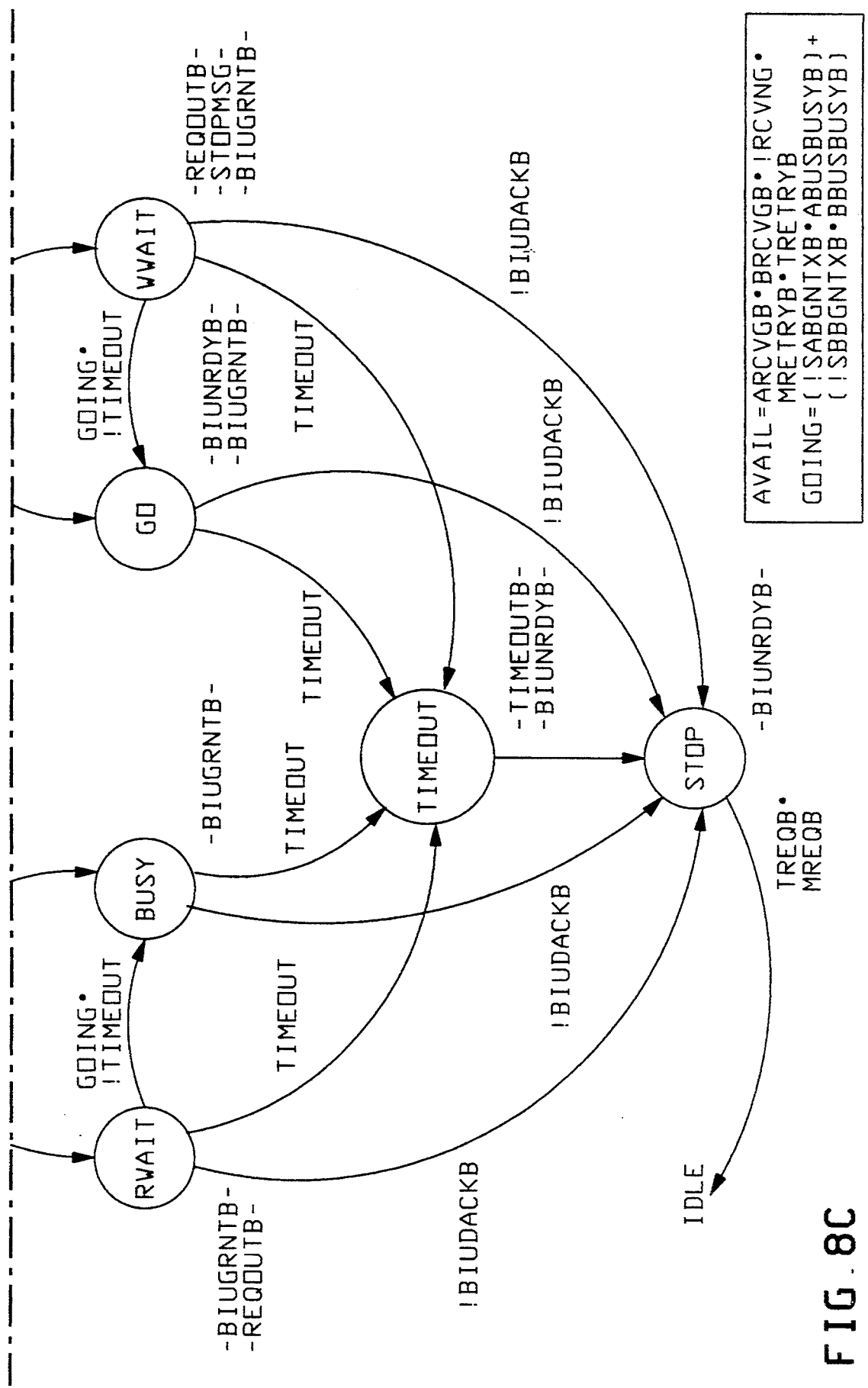

As seen in FIG. 8A the timeout state machine $10_{tn}$ is connected to various of the other modules in the bus interface unit system. The timeout state machine $10_{tm}$ will be seen to receive signals from the system bus such as $12_a$ from the bus interface unit receive logic $10_{ra}$, from the bus interface unit $10_u$, from the processor logic 28, from the translator box $20_x$, from the mix unit $10_n$, from the second bus interface unit receive state machine B, $10_{rb}$.

Likewise the timeout state machine will provide certain output signals as seen in FIG. 8A to the bus $12_a$, to the A Bus output register $18_{a0}$, to the return array logic $10_{rta}$, to the bus interface unit transmit state machine $10_{ta}$, to the bus interface unit receive state machine $10_{ra}$, to the processor logic 28 and, to the MIX unit $10_n$ and also to the transmit and receive state machines $10_{tb}$, $10_{rb}$, and the RETURN programmable array logic $10_{rtb}$.

FIG. 8A shows the timeout state machine $10_{tm}$ and the related modules with which it operates. This could be described as a system for requesting bus access (system bus A and B) and setting time limitations for execution of command cycles.

The timeout state machine does several important things, for example it checks to see if a command operation has "timed out", and is considered as an "error". This indicates that the time allotted for a given operation has exceeded 512 microseconds. The system will allow up to 16 tries for this type error or other errors.

Further the timeout state machine also functions to put out a bus request to access a system bus.

It also determines if any commanded operation has timed out, that is to say, is no longer a viable command which is capable of execution.

As seen in FIG. 8A, a number of input signals are provided to the timeout state machine $10_{tm}$. The first group of inputs come from the system busses such as system bus A and system bus B. These signals include the system bus A grant and the system bus B grant. Once the timeout state machine has made a system bus request, this signal (validated with A bus busy or B bus busy) will indicate that the operation has been granted access to system bus A or system bus B.

The other inputs to the timeout state machine from the system bus include the system bus A-busy and the system bus B-busy signals. These signals will indicate that a bus operation is already currently in progress on system bus A or system bus B. The other input from the system bus to the timeout state machine is the clock signal designated as the 512 microsecond clock signal. This clock signal is to determine when bus access operations have timed out because each bus is busy or not available for too long a period.

There are a series of inputs from the error logging bus interface unit $10_u$ which signals include the processor bus interface unit request signal, and the Read invalid address signal which indicates that the processor has received an invalid address error and is now reading the address out of the internal registers. The processor bus interface unit request signal is a signal which validates the command signals for the processor 28. Added further inputs from the error log unit $10_u$, to the timeout state machine include the TBOX retry signal which causes the transfer box $20_x$ to stop sending a message and to retry again once the signal is inactive. It causes the timeout state machine $10_{tm}$ to remain in the idle state while it is active. The final signal from the error unit $10_u$ is the processor retry signal. If this signal becomes active, it causes the processor logic 28 to stop sending its commands to the bus interface unit 10 and to retry it again once the signal is inactive. It causes the timeout state machine to remain in the idle state while the signal is active.

There are several inputs from the processor 28 to the timeout state machine and these signals include the processor bus interface unit request line, the processor command signal line, and the processor data valid line which indicates that valid data is driven to the bus interface unit 10 by the processor. The processor command signals contain encoded values which were shown in Table I.

The transfer box $20_x$ provides an input signal to the timeout state machine $10_{tm}$ which is designated as the transfer box bus interface unit request signal. This signal indicates to the bus interface unit 10 that the transfer box would like to start sending a message onto the system bus ($12_a$, $12_b$).

The mix logic $10_m$ of FIG. 8A provides an output signal to the timeout state machine which is designated as the bus interface unit data acknowledge signal. This signal indicates to the receiver that the current operation is completed, and the data is being returned from the system bus to the processor 28, and is now valid.

The bus interface receive state machines $10_{ra}$ and $10_{rb}$ each provide inputs to the timeout state machine. These are called the A side receiving message and the B side receiving messages so that this signal will be active whenever the receiving state machine is in the process of receiving a message from the A system bus $12_a$ or alternatively from the B system bus $12_b$.

Another input is provided to the timeout state machine $10_{tm}$ by a signal line from the MIX unit $10_m$. This signal is the bus interface unit data acknowledge signal. This signal indicates to the timeout $10_{tm}$ state machine that the current operation has been completed and if data is being returned from the system bus ($12_a$, $12_b$) to the processor 28, this data is now valid.

The timeout state machine $10_{tm}$ provides a series of output signals to the related modules in the system as discussed hereinunder.

The bus interface unit processor grant signal is seen provided as an output from the timeout state machine to the processor 28. This signal indicates to the IMP processor logic that the bus interface unit 10 has accepted and loaded the command and the address and is now ready to accept the data during an operation.

There are two outputs from the timeout state machine which are fed to the bus interface unit receive state machines A and B ($10_{ra}$, $10_{rb}$) by means of signals designated as the bus interface unit-not ready signal. This signal tells the BIU receive-state machine that any incoming message should get a "not ready". The timeout state machine issues this command when it will be finishing an operation in a few clocks and when it is safe to write over the internal registers, $16_{ai}$, $16_{bi}$.

There are two outputs from the timeout state machine $10_{tm}$ to each of the A and B transmit state machines $10_{ta}$ and $10_{tb}$. These signals are designated as the operation timeout signal. If this signal becomes active it indicates that the present operation has timed out waiting for a system bus grant or waiting for data to be returned during a read operation, or a destination module has asserted itself as not being ready for too long a period. It will be noted that this operation timeout signal is also conveyed to the return state machines $10_{rta}$ and $10_{rtb}$.

The timeout state machine $10_{tm}$ puts an output signal to the A and B bus output register $18_{a0}$, $18_{ab}$, which is known as the load output register signal. This signal causes the output registers for the A bus and the B bus to load data.

The final output line of the timeout state machine $10_{tm}$ is a signal line to the system busses ($12_a$, $12_b$,) and provides a signal designated as the system bus request signal. This signal causes a request to a system bus arbitrator in the central processing module 8 for use of one of the system busses. It will remain active until a bus is granted or else the request is timed out.

FIG. 8B is a flow chart diagram which shows the functional operations of the timeout state machine. As seen in FIG. 8B the basic function in the timeout machine is to note that when a request for data is made, then there is a waiting or a busy period available for subsequent requests until the timeout period has occurred at which case the command cycle will come to a stop.

Likewise in FIG. 8B, the situation for a Write operation shows that after a bus grant and a Write wait period, then the condition will revert to the timeout period which will result in a stop indicating that none of the resources were available to allow the command cycle to be completed.

The following is a list of inputs provided to the timeout state machine $10_{tm}$:

INPUTS: TIMEOUT STATE MACHINE, FIG. 8B

System Bus A Grant (SA_BGNT$_x$_B)
 Source: System Bus Arbitrator
 Dest: TIMEOUT PAL, TBXCNTR PAL, BIU-XMT PAL
 Polarity: Active Low
 Type: Unidirectional
 Once the TIMEOUT PAL has made a system bus request, this signal, validated with A_BUSBUSY_B, will indicate that the operation has been granted system bus A.
System Bus B Grant (SB_BGNT$_x$_B)
 Source: System Bus Arbitrator
 Dest: TIMEOUT PAL, TBXCNTR PAL, BIU-XMT PAL
 Polarity: Active Low
 Type: Unidirectional
 Once the TIMEOUT PAL has made a system bus request, this signal, validated with B_BUSBUSY_B, will indicate that the operation has been granted system bus B.
System Bus A Busy (A_BUSBUSY_B)
 Source: System Bus through driver
 Dest: TIMEOUT PAL, BIU-XMT PAL, CACHE, TBXCNTR PAL
 Polarity: Active Low
 Type: Unidirectional
 This signal indicates that a bus operation is currently in progress on system bus A.
System Bus B Busy (B_BUSBUSY_B)
 Source: System Bus through driver
 Dest: TIMEOUT PAL, BIU-XMT PAL, CACHE, TBXCNTR PAL
 Polarity: Active Low
 Type: Unidirectional
 This signal indicates that a bus operation is currently in progress on system bus B.
BIU Data Acknowledge (BIU_DACK_B)
 Source: MIX PAL
 Dest: TIMEOUT PAL, TBOX 20, synchronized in BIU 10 to IMP Processor Logic 28.
 Polarity: Active Low
 Type: Unidirectional
 This signal indicates to the receiver that the current operation has been completed and if data is being returned from the system bus to the processor logic, it is now valid.
TBOX BIU Request (T_BREQ_B)
 Source: TBOX
 Dest: TIMEOUT PAL, BIU-XMT PALS, TAGCHCK PAL, RETURN PALS
 Polarity: Active Low
 Type: Unidirectional
 This signal indicates to the BIU 10 that the TBOX 20 would like to start sending a message onto the system bus.
IMP PROCESSOR BIU REQUEST (M_BREQ1-6_B)
 Source: CMDREQ PAL synchronized in Error Log Unit.
 Dest: TIMEOUT PAL, BIU-XMT PAL, RETURN PAL
 Polarity: Active Low
 Type: Unidirectional
 This signal validates the signals M_CMD016 and M_CMD116.
IMP PROCESSOR COMMAND SIGNALS (M_CMD016, M_CMD116)
 Source: CMDREQ PAL synchronized in Error Log Unit $10_u$.
 Dest: TIMEOUT PAL, BIU-XMT PAL, RETURN PAL
 Polarity: Encoded Value
 Type: Unidirectional
 These signals contain the encoded values of different BIU operations. Table I . indicates values.
512 Microsecond Clock (C0_CLK512_U)
 Source: Clock Drivers
 Dest: TIMEOUT PAL
 Polarity: Clock
 Type: Unidirectional
 This 512 microsecond clock is used to determine when bus operations have timed out.
Read Invalid Address (RDINVADR16)

Source: CMDREQ PAL synchronized in Error Log Unit $10_u$.
Dest: TIMEOUT PAL, RETURN PAL
Polarity: Active High
Type: Unidirectional
This signal indicates that the IMP processor has received an invalid address error and is now reading the address out of the internal registers.

IMP Data Valid ( M_DATAVAL16_B)
Source: CONTROL PAL synchronized in Error Log Unit $10_u$.
Dest: TIMEOUT PAL
Polarity: Active Low
Type: Unidirectional
This signal indicates that valid data is being driven to the BIU logic by the IMP processor 28.

A Side Receiving Message (A_RCVG_B)
Source: BIU-RCV PAL
Dest: TIMEOUT PAL, DECODER PAL, TBOX, TBXCNTR PAL, RETURN PAL
Polarity: Active Low
Type: Unidirectional
This signal will be active whenever the BIU-RCV PAL is in the process of receiving a message from the A side system bus.

B Side Receiving Message (B_RCVG_B)
Source: BIU-RCV PAL
Dest: TIMEOUT PAL, DECODER PAL, TBOX, TBXCNTR PAL, RETURN PAL
Polarity: Active Low
Type: Unidirectional
This signal will be active whenever the BIU-RCV PAL is in the process of receiving a message from the B side system bus.

TBOX Retry (T_RETRY_B)
Source: Error Log Unit $10_u$.
Dest: TIMEOUT PAL, TBOX
Polarity: Active Low
Type: Unidirectional
If this signal becomes active, it causes the TBOX 20 to stop sending a message and to retry again once the signal is inactive. It causes the TIMEOUT PAL to remain in the idle state while it is active.

IMP Processor Retry (M_RETRY_B)
Source: Error Log Unit $10_u$
Dest: TIMEOUT PAL, TBOX LCA
Polarity: Active Low
Type: Unidirectional
If this signal becomes active, it causes the IMP processor logic to stop sending its operation to the BIU 10 and to retry again once the signal is inactive. It causes the TIMEOUT PAL to remain in the idle state while it is active.

The Timeout state machine also includes a number of output signal lines which are listed hereinbelow together with their function:

OUTPUTS: TIMEOUT STATE MACHINE, FIG. 8B

System Bus Request (SA_BREQ$_x$_B)
Dest: System Bus Arbitrator in CPM 8
Polarity: Active Low
Type: Unidirectional
This signal makes a request to the system bus arbitrator for use of one of the system buses. It will remain active until a bus is granted or it is timed out.

Operation Timeout (TIMEOUT_B)
Dest: BIU-XMT PAL, Error Log Unit, RETURN PAL
Polarity: Active Low
Type: Unidirectional
If this signal becomes active, it indicates that the present operation has timed out waiting for a system bus grant, or waiting for data to be returned during a read type operation, or a destination module has asserted not-ready too long.

Load Output Register (BIU_LDORG_B)
Dest: TAGCHCK PAL
Polarity: Active Low
Type: Unidirectional
This signal causes the output registers ($16_{ao}$, $16_{bo}$) for the A and B bus to load data.

BIU IMP Processor Grant (BIU_MGRNT_B)
Dest: DIRECT PAL, CONTROL PAL synchronized in Error Log Unit $10_u$.
Polarity: Active Low
Type: Unidirectional
This signal indicates to the IMP processor logic that the BIU 10 has accepted and loaded the command and address, and is now ready to accept the data during an operation.

Stop Incoming Message (STOP_MSG)
Dest: MIX PAL ($10_m$)
Polarity: Active High
Type: Unidirectional
This signal tells the BIU-RCV PAL that any incoming message should get a retry. The TIMEOUT PAL issues this command to prevent the internal registers from being overwritten.

BIU Not Ready (SIU_NRDY_B)
Dest: BIU-RCV PAL
Polarity: Active Low
Type: Unidirectional
This signal tells the BIU-RCV PAL that any incoming message should get a not-ready. The TIMEOUT PAL issues this command when it will be finishing an operation in a few clocks and it is safe to write over the internal registers, $16_{ai}$, $16_{bi}$.

TIMEOUT NON-FUNCTIONAL SIGNALS:
TIMEOUT Internal Flip-Flop's

FF0, FF1 These two flip-flop's are used to create a single internal pulse to indicate when a 512 microsecond clock edge has occurred, since the pulse length of the 512 microsecond clock is longer than one 16 MHz clock. When the 512 microsecond clock first becomes active, FF0 is set. It is reset when the 512 microsecond clock becomes inactive. FF1 is set by FF0 becoming active while it is reset by FF0 becoming inactive. An edge is detected by looking for FF0 being active and FF1 being inactive.

EDGE This flip-flop is set when a 512 microsecond clock edge is detected while the timeout state machine is in any of the following states: wait, busy, go, req, write, or wait. It is reset in the last state, stop, which will always be the last state during the state transitions. To detect a timeout, the different states need only to look for another edge, FF0 being active and FF1 being inactive when edge has already been set.

RCVNGFF This flip-flop is set when either A_RCVG_B or B_RCVG_B is active. It is reset when both are inactive. It is used by the TIMEOUT PAL to determine whether a message is currently being received so as to determine whether it can safely accommodate an IMP processor request or a TBOX request.

The timeout state machine provides some twelve discrete functional states which are shown in FIG. 8B. The various states and the state transitions involved are listed hereinbelow together with the functions that they provide.

IDLE When the reset signal (405_RESETx) is applied to the TIMEOUT PAL, the state machine will go to the IDLE state (FIG. 8B). It will also return to this state after an operation is completed. While in this state all output signals are inactive.

INVADR This state is entered when a read invalid address operation is in progress. Its active outputs are BIU_MGRNT_B to indicate that the BIU 10 has accepted and is handling the command, and STOP_MSG to prevent any incoming messages from overwriting the internal register, ($16_{ai}$, $16_{bi}$).

PAUSE This is the first state of an overwrite or read-lock operation. Its active outputs are BIU_LDOREG_B to load the command and address data into the output registers, ($16_{ao}$, $16_{bo}$) and STOP_MSG to prevent any incoming messages from loading into the internal register ($16_{ai}$, $16_{bi}$).

GRNT This state is necessary to indicate to the IMP processor logic that the command and address have been loaded into the output registers and the IMP processor can now drive the data phase of the operation. The active outputs are STOP_MSG to prevent any incoming messages from loading into the internal register, and BIU_MGRNT_B to indicate that the BIU 10 is ready for data.

WRITE Once the data has been driven to the IMP processor, a system bus request can be issued. This is done with SA_BREQ$_x$_B which requests both system buses. Only one will be granted. The state machine also starts checking for being timed out during this state. STOP_MSG and BIU_MGRNT_B are still active.

WAIT If the first clock after a system bus request a system bus grant, SA_BGNT$_x$_B or SB_BGNT$_x$_B, has not been received, this state will be entered. It continues with the same active outputs as the write state.

GO If the first clock after a system bus request is a system bus grant, SA_BGNT$_x$_B or SB_BGNT$_x$_B, this state will be entered. It continues keeping BIU_MGRNT_B active, and BIU_NRDY_B becomes active to hold off any incoming messages until the operation has been completed.

REQ This is the first state of a read or send message operation. Its active outputs are SA_BREQ$_x$_B to make the system bus request, and BIU_LDORG_B to load the output register with the command and address.

WAIT If the first clock after a system bus request is a system bus grant, SA_BGNT$_x$_B or SB_BGNT$_x$_B, which has not been received, this state will be entered. It continues with the same active outputs as the req state.

BUSY If the first clock after a system bus request is a system bus grant, SA_BGNT$_x$_B or SB_BGNT$_x$_B, this state will be entered. BIU_MGRNT_B becomes active to indicate that read data will soon be returned.

TIMEOUT This state is entered when the operation has timed out either waiting for a system bus to be granted or waiting for read data to be returned, or if a destination module asserts a not-ready for too long. The active outputs are TIMEOUT_B to indicate a timeout has occurred, and BIU_NRDY_B to hold off any messages.

STOP This final state for all operations acts as a wait state while an operation finishes, allowing enough time for read data to be returned and signals that are synchronized to go inactive. The only active output is BIU_NRDY_B.

STATE TRANSITIONS: TIMEOUT STATE MACHINE, FIG. 8B

IDLE to INVADR: This transition takes place when the signal RDINVADR16 becomes active. It causes any incoming messages to be retried to prevent the invalid address saved in the internal register from being overwritten.

INVADR to IDLE: Once a rdinvadr operation has been completed, the RDINVADR16 signal will go inactive. The state machine will go back to idle to await the next operation.

IDLE to REQ: If the IMP processor logic makes a request to do a read operation or the T_BREQ_B signal is active, and a message is not being received with A_RCVG_B or B_RCVG_B being active and no CPM internal retries such as M_RETRY_B or T_RETRY_B are pending, this transition will take place.

REQ to BUSY: Once a request has been made to the system bus, if a grant is received on the first clock, SA_BGNT$_x$_B and not A_BUSBUSY_B, or SB_BGNT$_x$_B and not B_BUSBUSY_B, then this transition will be made. Otherwise, the state req will transition to wait.

REQ to WAIT: During the state req, if a system bus grant is not received, this transition will be made.

BUSY to TIMEOUT: If a timeout occurs due to waiting for read data to return or a destination module asserts not-ready for too many clocks, this transition will take place. The process of timing out was discussed in prior section on TIMEOUT Internal Flip-Flop's.

BUSY to STOP: The BIU logic will assert BIU_DACK_B which causes this transition to take place. This is done if the read or send message operation takes place successfully or a retry of the operation is done.

WAIT to BUSY: While in the wait state, the state machine is waiting for either a timeout or a bus grant. This particular transition takes place when a system bus is granted.

WAIT to TIMEOUT: If a timeout occurs while waiting for the system bus to be granted, this transition will take place.

TIMEOUT to STOP: Once the a timeout has occurred, this transition takes place to allow various synchronized signals time to become inactive before the next operation.

IDLE to PAUSE: If the IMP processor logic makes a request to do an overwrite or a readlock operation, and a message is not being received with A_RCVG_B or B_RCVG_B being active and no CPM internal retries such as M_RETRY_B or T_RETRY_B are pending, this transition will take place.

PAUSE to GRNT: Pause is a one clock state to allow the output registers ($16_{ao}$, $16_{bo}$) to be loaded with the command and address before the BIU_MGRNT_B signal is issued to have the IMP processor logic begin the data phase of the operation.

GRNT to WRITE: This transition is made when the IMP processor has indicated with the M_DATA-VAL16_B signal that it is driving the data portion of the operation.

WRITE to GOING: Once a request has been made to the system bus, if a grant is received on the first clock, SA_BGNT$_x$_B and not A_BUSBUSY_B, or SB_BGNT$_x$_B and not B_BUSBUSY_B, than this transition will be made. Otherwise, the state write will transition to wait.

WRITE to WAIT: During the state write, if a system bus grant is not immediately received, this transition will be made.

GO to TIMEOUT: If a timeout occurs because a destination module asserts not ready for too many clocks, this transition will take place. The process of timing out is discussed in the prior section on TIMEOUT Internal Flip-Flop's.

GO to STOP: The BIU 10 logic will assert BIU_DACK_B which causes this transition to take place. This is done if the readlock or overwrite message operation takes place successfully or a retry of the operation is done.

Described herein has been a programmable receive control and routing apparatus in a bus interface unit for enabling receipt of message data from dual system busses while insuring data integrity and for routing received messages to the proper receiving module while also initiating retries when a destination module is not yet available. The apparatus also provides capability of acknowledging remote sending modules when a message is received by its destined receiving module.

What is claimed is:

1. A receive control apparatus in a bus interface unit for control of receiving data from a first and second system bus means and wherein said data is destined for a processor means and/or a translation logic means which receive multiple word message data communication protocol from multiple external modular resource units including a main memory means using a single word message data protocol connected to said system bus means, and wherein said translation logic means converts said multiple word message data communication protocol from said system bus means to a single word protocol compatible with said processor means, said receive control apparatus comprising:
   (a) said bus interface unit connecting said processor means and said translation logic means to said first and second system bus means, said bus interface unit including:
      (a1) input register means for receiving and holding consecutive single words of said multiple word message data communication protocol from said system bus means, said data being destined for said translation logic means and/or said processor means;
      (a2) programmable receive logic means to release each one of said consecutive words of said multiple word message data communication protocol in said input register means for transmittal to said translation logic means, and to release single word message data protocol from said main memory means to said processor means via multiple bus exchange means, said programmable receive logic means including:
         (i) decoder means to sense when said system bus means has data destined for said processor means;
         (ii) means to sense when said translation logic means is busy;
         (iii) means to initiate transmission retries, from a said external modular resource unit which had not completed a data transmission that had been initiated, to seek a period when said processor means or said translation logic means is available to receive said message word data from said input register means;
      (a3) multiple bus exchange means connecting said input register means to said translation logic means or said processor means.

2. The apparatus of claim 1 wherein said programmable receive logic means includes:
   (a) means to sense when said bus interface unit is busy and not ready for receiving data destined for said processor means;
   (b) means to abort an ongoing receiving data transfer cycle.

3. The apparatus of claim 2 wherein said programmable receive logic means includes:
   (a) means to detect a parity error or system bus error and to signal an abort operation to said system bus means;
   (b) means to initiate a retry signal to a prior transmitting external modular resource unit whose data was not received at its destined processor means or translation logic means.

4. The apparatus of claim 2 wherein said programmable receive logic means includes:
   (a) means to sense when said processor means or said translator logic means is not ready to receive data destined for it;
   (b) means to sense when a system bus is no longer busy due to having an ongoing message request aborted.

5. The apparatus of claim 4 which includes:
   (a) a timeout module means programmed to count and to limit the time periods for an external modular resource unit to seek access to said system bus means;
   (b) and wherein said programmable receive logic means includes:
      (b1) means to signal said translation logic means and said timeout module means that a message for said translation logic means is currently being received from said system bus means.

6. The apparatus of claim 5 wherein said programmable receive logic means includes:
   (a) means to access said first and second bus means to signal a transmitting external modular resource unit to retry its send-data operation at a later time if said translation logic means is not available as a destination.

7. The apparatus of claim 1 wherein said decoder means includes:
   (a) means to sense that message word data or command data received from said system bus means and held in said input register means, is valid and available for transfer to said translation logic means or to said processor means.

8. The apparatus of claim 1 wherein each one of said system bus means is serviced by its own input register means and its own programmable receive logic means.

9. The apparatus of claim 1 wherein said programmable receive logic means includes:
(a) means to initiate an acknowledgement signal onto said system bus means to signal a transmitting external resource module that its transmitted message was received by said processor means.

10. In a system for transferring words of message data from external digital modules to a processor where a bus interface unit (BIU) connects, via a multiple bus exchange means, first and second system busses of a dual bus means to a central processing module (CPM) having said processor operating on a first protocol—clock rate and a translation logic means for converting a second protocol—clock rate of said dual bus means to said first protocol-clock rate, said dual bus means connecting a main memory and said external digital modules to said bus interface unit, a receiving control logic system comprising:
(a) first and second receive logic state machines for servicing respectively a first system bus and second system bus of said dual system bus means wherein each of said first and second receive logic state machines includes:
(a1) means to control the conveyance of messages from one of said dual system busses to a multiple bus exchange means connected to said processor and said translation logic means, including:
(a1a) means to initiate transmission of said words of message data received in a first and second input register means;
(b) said first and second input register means, connected to said first and second receive logic state machines, for receiving and holding said words of message data received from said external digital modules on said dual system bus means, each of said input register means including:
(b1) means to signal said receive logic state machine that an external digital module has control of said system bus;
(b2) means to signal said receive logic state machine that words of message data received from said system bus are valid and residing in one of said input register means;
(c) said dual system bus means including:
(c1) said first system bus for conveying incoming words of message data to said first input register means;
(c2) said second system bus for conveying incoming words of message data to said second input register means;
(d) said multiple bus exchange means for identifying the data destination and connecting said input register means to said processor or said translation logic means for conveyance of said words of message data.

11. The system of claim 10 wherein said second receive logic state machine includes:
(a) means to signal said first receive logic state machine that said second receive logic state machine is asserting a NOT READY signal on said second system bus.

12. The system of claim 11 wherein said first receive logic state machine includes:
(a) means to signal said second receive logic state machine that said first receive logic state machine is asserting a NOT READY signal on said first system bus.

13. The system of claim 10 wherein each of said first and second receive logic state machines includes:
(a) means to generate an acknowledgement signal, destined for an originating external digital module, onto said first or second system bus means when received message data words have reached their destination.

14. The system of claim 10 wherein each of said first and second receive logic state machines includes:
(a) means to signal an originating external module that its word message data destined for said processor or translation logic means, is not deliverable and said external module should retry its transmission.

15. The system of claim 10 wherein each of said first and second receive logic state machines includes:
(a) means to signal an originating external module that both said first and second system busses are busy simultaneously receiving messages and that said external module should retry its transmission.

16. The system of claim 10 wherein each of said first and second input register means includes:
(a) decoder means for signaling said receive logic state machine that word message data, destined for said central processing module, is extant on said system bus means.

* * * * *